(12) United States Patent
Hicks, III

(10) Patent No.: US 8,405,499 B2
(45) Date of Patent: Mar. 26, 2013

(54) METHODS, SYSTEMS, AND PRODUCTS FOR SECURITY SERVICES

(75) Inventor: John Alson Hicks, III, Roswell, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 881 days.

(21) Appl. No.: 12/537,358

(22) Filed: Aug. 7, 2009

(65) Prior Publication Data

US 2011/0032095 A1 Feb. 10, 2011

(51) Int. Cl.
*G08B 29/00* (2006.01)
*G08B 1/00* (2006.01)
*H04N 7/18* (2006.01)

(52) U.S. Cl. .......... 340/516; 340/531; 348/143

(58) Field of Classification Search .......... 340/516, 340/531; 348/143
See application file for complete search history.

(56) References Cited

U.S. PATENT DOCUMENTS

| | | | |
|---|---|---|---|
| 6,038,289 A | 3/2000 | Sands | |
| 6,067,346 A | 5/2000 | Akhteruzzaman et al. | |
| 6,271,752 B1 | 8/2001 | Vaios | |
| 6,400,265 B1 | 6/2002 | Saylor et al. | |
| 6,914,896 B1 | 7/2005 | Tomalewicz | |
| 6,975,220 B1 | 12/2005 | Foodman et al. | |
| 7,015,806 B2 | 3/2006 | Naidoo et al. | |
| 7,113,090 B1 | 9/2006 | Saylor et al. | |
| 7,239,689 B2 | 7/2007 | Diomelli | |
| 7,248,161 B2 | 7/2007 | Spoltore et al. | |
| 7,323,980 B2 | 1/2008 | Faulkner et al. | |
| 7,679,507 B2 | 3/2010 | Babich et al. | |
| 7,779,141 B2 | 8/2010 | Hashimoto et al. | |
| 7,853,261 B1 | 12/2010 | Lewis et al. | |
| 7,855,635 B2 | 12/2010 | Cohn et al. | |
| 7,920,580 B2 | 4/2011 | Bedingfield, Sr. | |
| 2002/0193107 A1 | 12/2002 | Nascimento, Jr. | |
| 2003/0025599 A1 | 2/2003 | Monroe | |
| 2004/0086093 A1 | 5/2004 | Schranz | |
| 2004/0177136 A1* | 9/2004 | Chen et al. ............ | 709/223 |
| 2004/0196833 A1 | 10/2004 | Dahan et al. | |
| 2005/0066033 A1 | 3/2005 | Cheston et al. | |
| 2006/0064505 A1 | 3/2006 | Lee et al. | |
| 2006/0067484 A1 | 3/2006 | Elliot et al. | |
| 2006/0239250 A1 | 10/2006 | Elliot et al. | |
| 2007/0115930 A1 | 5/2007 | Reynolds et al. | |
| 2007/0226344 A1 | 9/2007 | Sparrell et al. | |
| 2008/0090546 A1 | 4/2008 | Dickinson et al. | |
| 2008/0191857 A1 | 8/2008 | Mojaver | |
| 2008/0261515 A1 | 10/2008 | Cohn et al. | |
| 2008/0279345 A1 | 11/2008 | Zellner et al. | |
| 2008/0311879 A1* | 12/2008 | Martin et al. .......... | 455/404.1 |
| 2009/0017751 A1 | 1/2009 | Blum | |
| 2009/0058630 A1 | 3/2009 | Friar et al. | |
| 2009/0109898 A1 | 4/2009 | Adams et al. | |
| 2009/0191858 A1 | 7/2009 | Calisti et al. | |
| 2009/0274104 A1* | 11/2009 | Addy .................... | 370/329 |
| 2010/0145161 A1 | 6/2010 | Niyato et al. | |
| 2010/0281312 A1 | 11/2010 | Cohn et al. | |
| 2011/0113142 A1 | 5/2011 | Rangegowda et al. | |
| 2011/0197246 A1 | 8/2011 | Stancato et al. | |
| 2011/0244854 A1 | 10/2011 | Hansson et al. | |

* cited by examiner

*Primary Examiner* — George Bugg
*Assistant Examiner* — Jack K Wang
(74) *Attorney, Agent, or Firm* — Scott P. Zimmerman PLLC

(57) ABSTRACT

Methods, systems, and products are disclosed for notification of alarms in security systems. A packetized alarm message is received from a security system associated with a network address. The network address is associated to a notification address. A Voice-over Internet Protocol call to the notification address is initiated over a data network to alert of an alarm from a security system.

20 Claims, 29 Drawing Sheets

METHODS, SYSTEMS, AND PRODUCTS FOR SECURITY SERVICES

BACKGROUND

Exemplary embodiments generally relate to communications and, more particularly, to alarm systems and to sensing conditions.

Security systems are common. When an alarm is detected, most security systems seize a phone line to call a monitoring station. That is, a plain-told telephone system ("POTS") call is made to alert the monitoring station of the alarm. This POTS-based security system is very reliable, but the telephone call may require more than thirty (30) seconds to set-up. Moreover, while the phone line is seized, a customer is unable to make or receive calls to other numbers—such as "911."

SUMMARY

Exemplary embodiments notify of alarms detected by security systems. When an alarm is detected, exemplary embodiments establish packet data communications (using a packet protocol) over a packet data network with a monitoring service. Exemplary embodiments, in other words, exchange data with the monitoring service over a data network, instead of using conventional voice communications over the plain-told telephone system ("POTS") network. Once an alarm is received by the monitoring center, an agent will attempt to contact the customer to verify that there is a real alarm condition. The agent may attempt to contact the customer by placing a Voice-over Internet Protocol call over the data network. The customer's traditional, plain-old telephone system line is unused and remains available. That is, the customer may dial "911" using a conventional telephone to obtain emergency help, while the customer simultaneously converses with an agent of the monitoring service over the Voice-over Internet Protocol call.

Exemplary embodiments include a method for notifying of an alarm detected by a security system. When the alarm is detected, the security system sends a packetized alarm message over a packet data network. The packetized alarm message is usually routed to a monitoring station associated with a professional security service (such as BRINKS HOME SECURITY® or ADT® home security). The monitoring station may then verify that the alarm is legitimate and not a "false alarm" by establishing a voice communication with the customer. When the alarm is received, the monitoring station analyzes the packetized alarm message to determine a network address from which the packetized alarm message was sent. The network address may then be associated to a physical street address, a contact telephone number, and/or a notification address. The monitoring station may then initiate a Voice-over Internet Protocol call over the data network to the notification address. A computerized or human agent at the monitoring station may then use the Voice-over Internet Protocol call to contact and to alert a customer of the alarm from the security system. The agent may verify that the alarm is real and not a "false" alarm prior to contacting police, fire and/or medical authorities.

More exemplary embodiments include a system for notifying of an alarm detected by a security system. The system detects the alarm and retrieves a network address associated with the alarm. A packetized alarm message is sent to the network address over a wireline broadband network connection to a data network. If the wireline broadband network connection is unavailable, then the packetized alarm message is sent over a wireless network connection to the data network. The packetized alarm message may route to the monitoring station associated with the professional security service. When the monitoring station receives the packetized alarm message, the computerized or human agent at the monitoring station may then initiate the Voice-over Internet Protocol call over a wireless access network to alert the customer of the alarm from the security system.

Still more exemplary embodiments include a computer readable medium that stores instructions for performing a method of alarm notification. When the alarm is detected, a network address associated with the alarm is retrieved. When a wireline broadband network connection is available to a data network, then the packetized alarm message is sent to the network address over the wireline broadband network connection. When the wireline broadband network connection is unavailable, then the packetized alarm message is sent over the wireless network connection to the data network. When the wireless network connection is unavailable to the data network, then the network address is associated to a telephone number. A telephone call is initiated to the telephone number to alert of the alarm in the security system.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
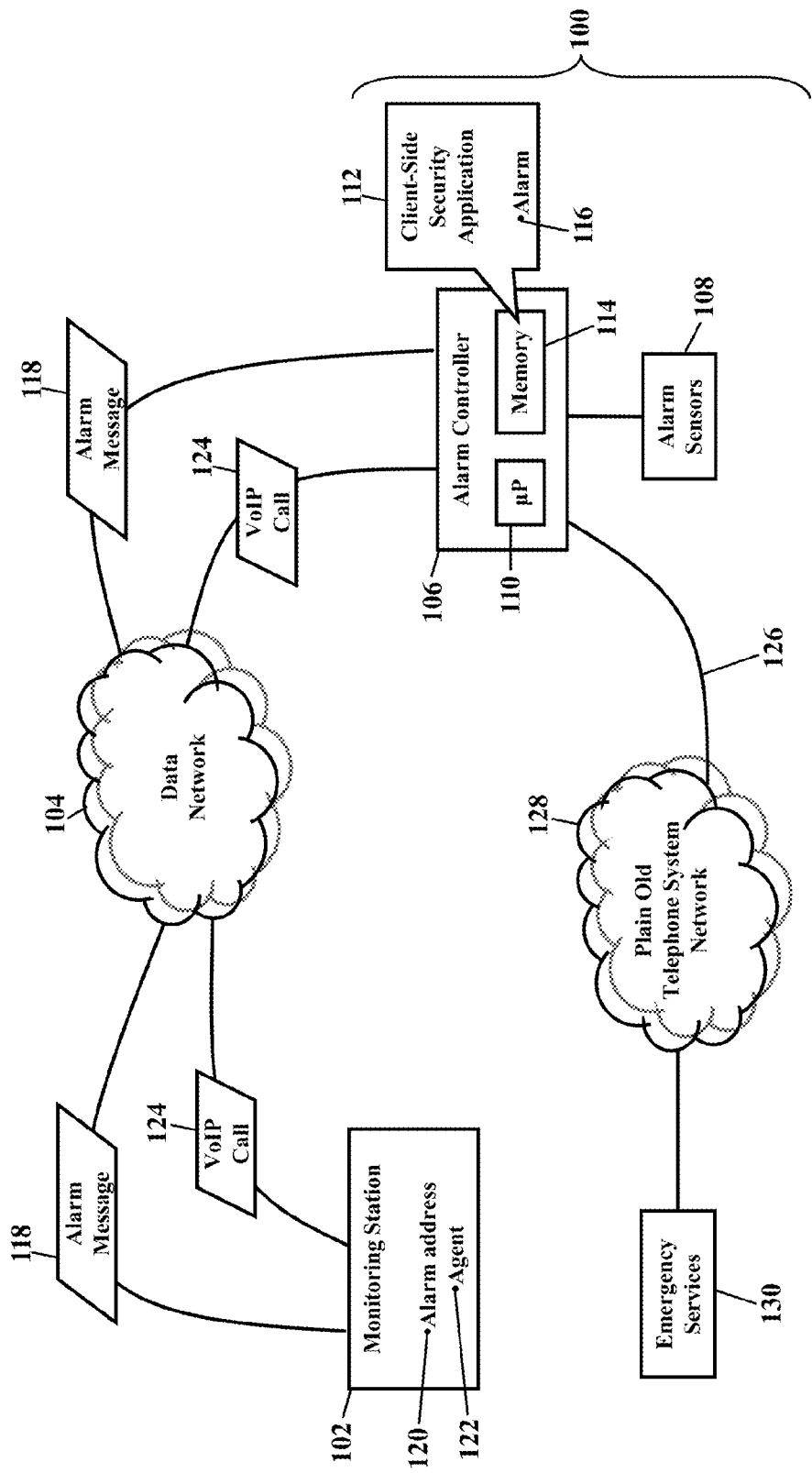
FIG. 1 is a simplified schematic illustrating an environment in which exemplary embodiments may be implemented.

FIG. 1 is a simplified schematic illustrating an environment in which exemplary embodiments may be implemented. A security system 100 communicates with a monitoring station 102 via a data network 104. The security system 100 has an alarm controller 106 that receives inputs from one or more alarm sensors 108. As those of ordinary skill in the art understand, the alarm sensors 108 monitor for heat, smoke, motion, sound, or any other physical or logical parameter that may indicate a security event. The security system 100 has a processor 110 (e.g., "µP"), application specific integrated circuit (ASIC), or other component that executes a client-side security application 112 stored in a memory 114. The client-side security application 112 monitors the inputs, status, or state of the alarm sensors 108. When an alarm 116 is detected, the client-side security application 112 has software code or instructions that cause the processor 110 to send an alarm message 118 to the monitoring station 102. The alarm message 118 routes into and through the data network 104 to an alarm address 120 associated with the monitoring station 102. When the monitoring station 102 receives the alarm message 118, the monitoring station 102 assigns a computerized or human agent 122. The agent 122 may then initiate a Voice-over Internet Protocol ("VoIP") call 124 over the data network 104 to verify the alarm 116 from the security system 100. A high percentage of alarms may be "false," even incurring fees from local police or other emergency services provider. The agent 122 may thus first verify the alarm 116 to avoid unnecessary dispatches. If the alarm is a legitimate security concern, the agent may summon emergency help, as later paragraphs will explain. Because the data network 104 is used to notify the monitoring station 102, and to route the packetized Voice-over Internet Protocol call 124, the security system 100 has not seized a telephone line 126 to a plain old telephone system 128. That is, a customer's traditional, plain-old telephone system line 126 is unused and remains available to dial "911" to obtain emergency help. Exemplary embodiments thus allow the customer to converse with the agent 122 at the monitoring station 102 (using the Voice-over Internet Protocol call 124) while simultaneously using the conventional telephone line 126 to call police, fire, or other emergency services 130.

Figure 2:
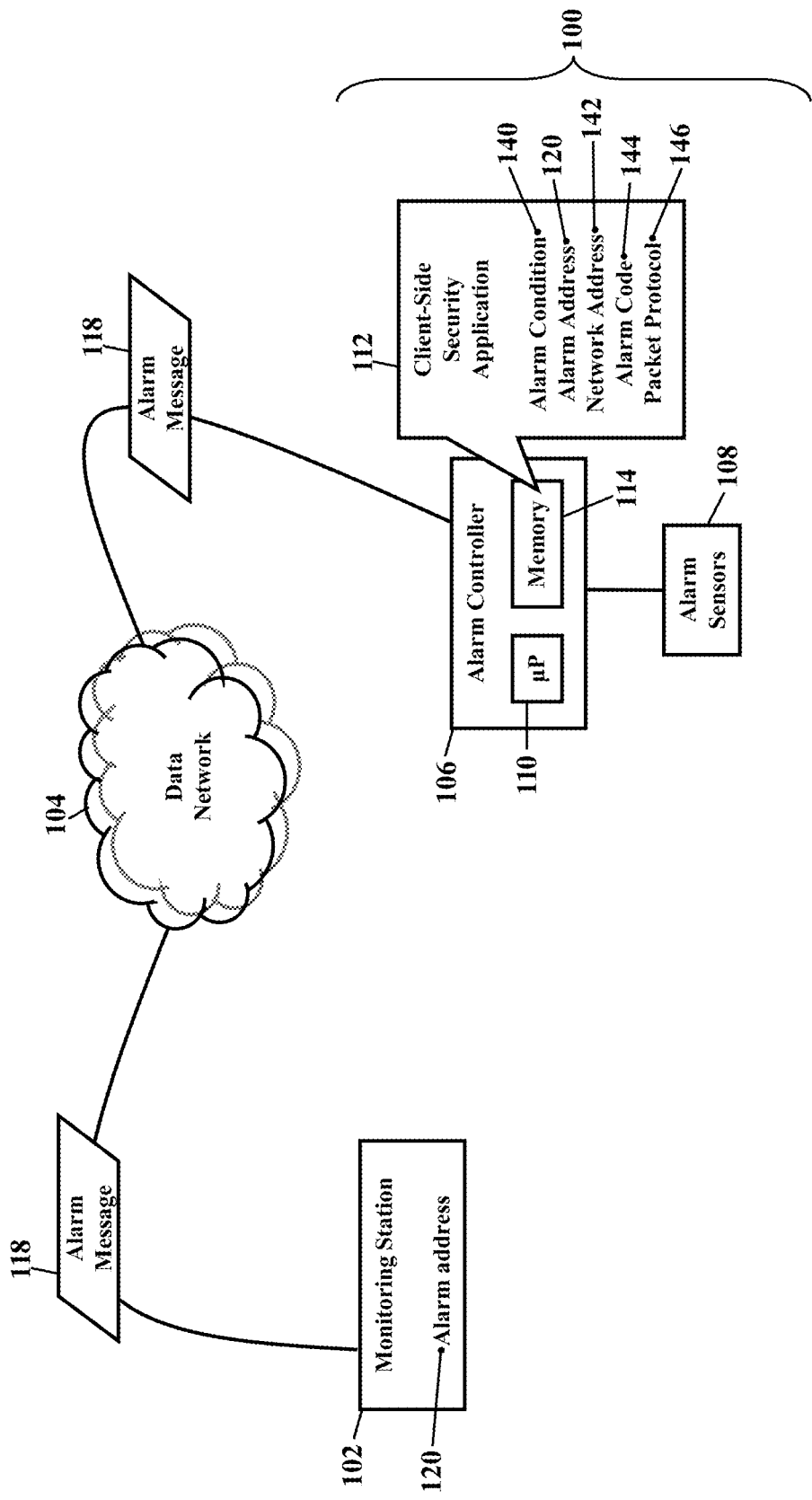
FIGS. 2-4 are more detailed schematics illustrating the exemplary embodiments.
Figure 3:
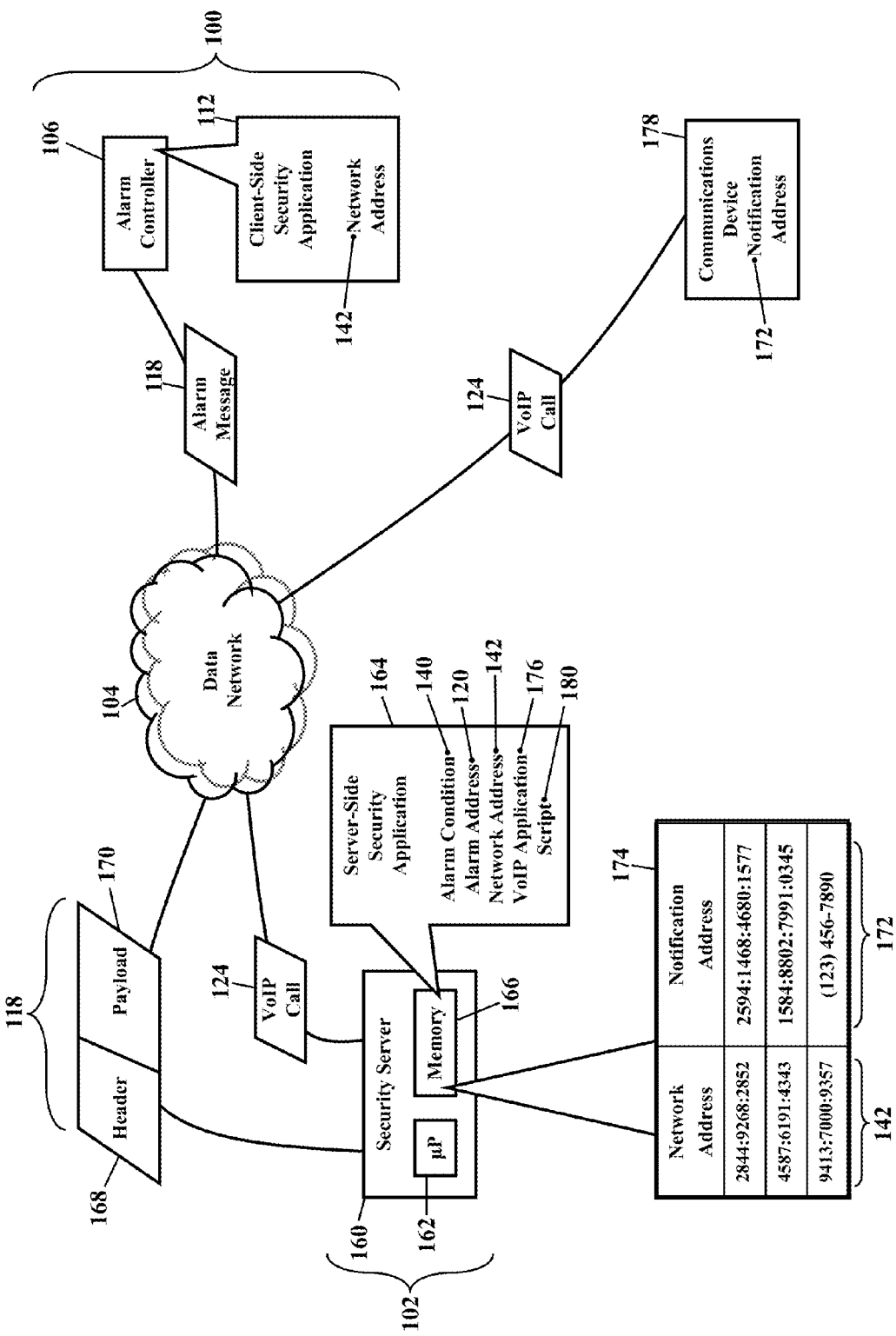
Figure 4:
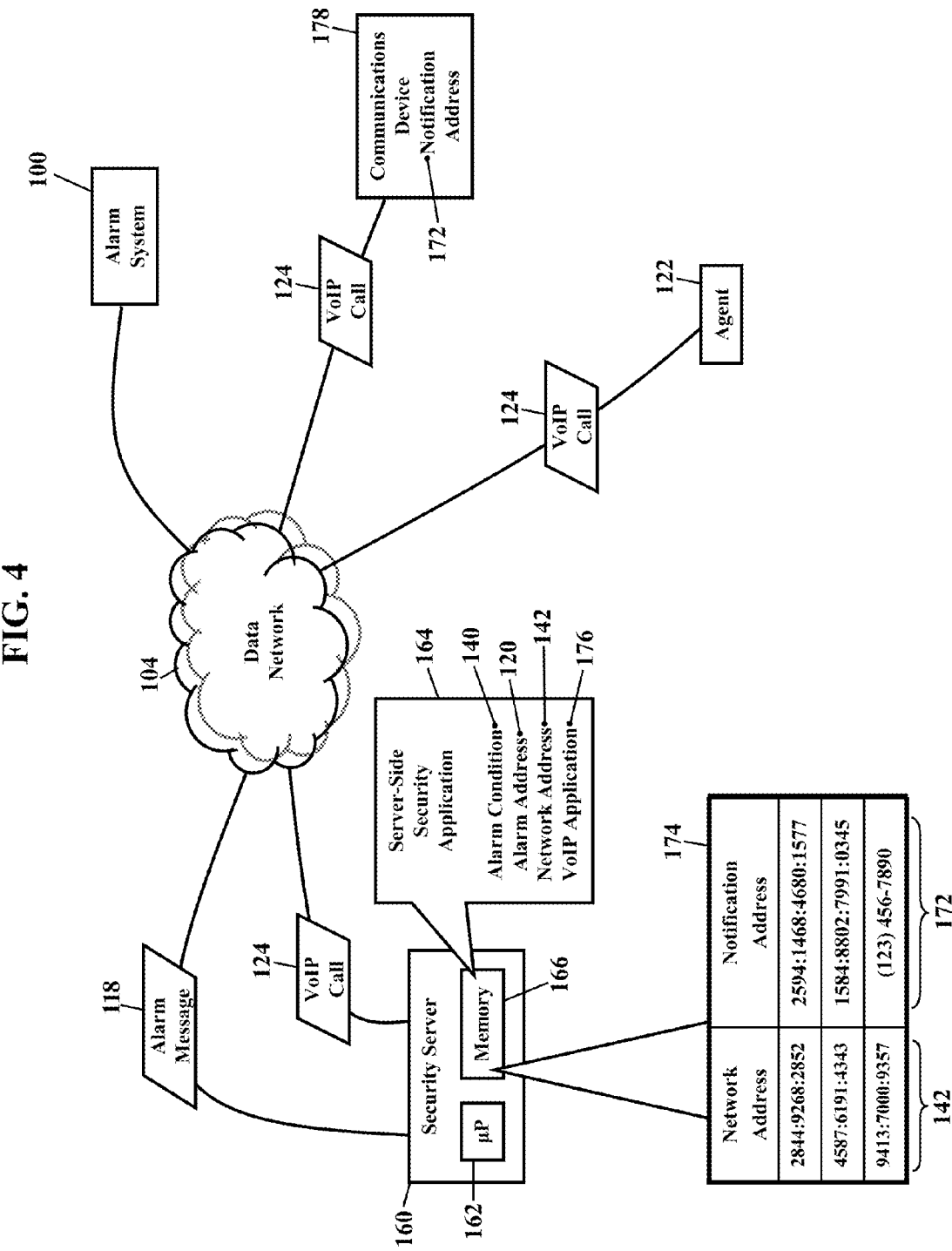

FIGS. 2-4 are more detailed schematics illustrating the exemplary embodiments. When the client-side security application 112 detects an alarm condition 140 from one of the sensors 108, the client-side security application 112 instructs the processor 110 to retrieve the alarm address 120 from the memory 114. The alarm address 120 is a network communications address at which the monitoring station 102 receives alarm messages from customers/subscribers of an alarm monitoring service. The alarm address 120 may be preloaded into the memory 114, and the alarm address 120 may be changed after a software update to the client-side security application 112. The client-side security application 112 then generates the alarm message 118. The alarm message 118 includes data that identifies a network address 142 associated with the security system 100 and/or the alarm controller 106. The alarm message 118 may also include data that describes the alarm condition 140, such as an alarm code 144 associated with the sensor 108. The alarm message 118 may also include information describing the customer and/or the customer's physical street address. Whatever data is included in the alarm message 118, the data is packetized according to a packet protocol 146. Once the alarm message 118 is formatted and ready, the processor 110 sends the alarm message 118 to the alarm address 120.

Any packet protocol 146 is suitable. As those of ordinary skill in the art understand, sometimes information is packetized (or "framed") for use in packet data networks. The information is grouped into packets according to the packet protocol 146. As those of ordinary skill in the art also understand, there are many packet protocols. Some of the more well-known packet protocols include TCP/IP, IPX/SPX, AppleTalk, and SNA. Some standards organizations, such as the I.E.E.E., issue standards for packetizing data. Some networks are "mixed." That is, the network receives and handles packets of differing protocols, and a "translator" determines the particular packet protocol and the appropriate destination for each packet. Because the basics of packetizing and packet protocols are well-known, this disclosure will not further explain the packetizing of the alarm message 118.

FIG. 3 is a detailed schematic illustrating receipt of the alarm message 118. The alarm message 118 routes from the alarm controller 106, through the data network 104, and to a security server 160 at the monitoring station 102. The security server 160 has a processor 162 (e.g., "µP"), application specific integrated circuit (ASIC), or other component that executes a server-side security application 164 stored in a memory 166. The server-side security application 164 and the client-side security application 112 cooperate in a client-server environment to notify of alarms from the security system 100.

When the security server 160 receives the alarm message 118, the server-side security application 164 obtains any data associated with the alarm message 118. The server-side security application 164, for example, retrieves the network address 142 associated with the security system 100 and/or the alarm controller 106. The network address 142, for example, may be extracted from one or more header portions 168 and/or from a payload portion 170 of the packetized alarm message 118. However the network address 142 is received, the server-side security application 164 associates the network address 142 to a notification address 172. The notification address 172 is a network communications address which is notified of the alarm condition 140 from the security system 100. The server-side security application 164, for example, queries a data table 174 that is stored in the memory 166 of the security server 160. The data table 174 maps, relates, or otherwise associates the network address 142 to the notification address 172. The server-side security application 164 retrieves the notification address 172 that is associated with the network address 142. The data table 174 only illustrates simple hexadecimal addresses, though; in practice, the addresses may be many bits and/or hexadecimal digits.

The server-side security application 164 may then initiate the Voice-over Internet Protocol call 124. Once the notification address 172 is known, the server-side security application 164 alerts the notification address 172 of the alarm condition 140 detected by the security system 100. The server-side security application 164 calls or invokes a Voice-over Internet Protocol ("VoIP") application 176. The VoIP application 176 is a software module or routine that establishes the Voice-over Internet Protocol call 124 to the notification address 172. The Voice-over Internet Protocol call 124 routes as packets of data over the data network 104 to notify the notification address 172 of the alarm condition 140 from the security system 100. As data table 174 illustrates, the notification address 172 may be any communications address or telephone number that is notified of the alarm condition 140. FIG. 3, for simplicity, illustrates the Voice-over Internet Protocol call 124 routing through the packet data network 104 to a communications device 178. In an automated mode of operation, the VoIP application 176 plays a prerecorded script 180 to a user of the communications device 178. The script 180 alerts the user of the alarm condition 140 detected by the security system 100.

FIG. 4 is a detailed schematic illustrating an optional process for human agents of the monitoring station 102, according to exemplary embodiments. When the security server 160 receives the alarm message 118, the server-side security application 164 again consults the data table 174 and associates the network address 142 to the notification address 172. Once the notification address 172 is known, the server-side security application 164 assigns a human agent 122 to the alarm condition 140. The server-side security application 164 may call or invoke a software module or subroutine that selects the available human agent 122 from a pool of agents. However the human agent 122 is chosen, the server-side security application 164 uses the Voice-over Internet Protocol ("VoIP") application 176 to establish the Voice-over Internet Protocol call 124 between the human agent 122 and the notification address 172. FIG. 4 again illustrates the Voice-over Internet Protocol call 124 routing through the data network 104 to the communications device 178. The human agent 122 may then converse with the user of the communications device 178 and alert the user of the alarm condition 140 detected by the security system 100.

Figure 5:
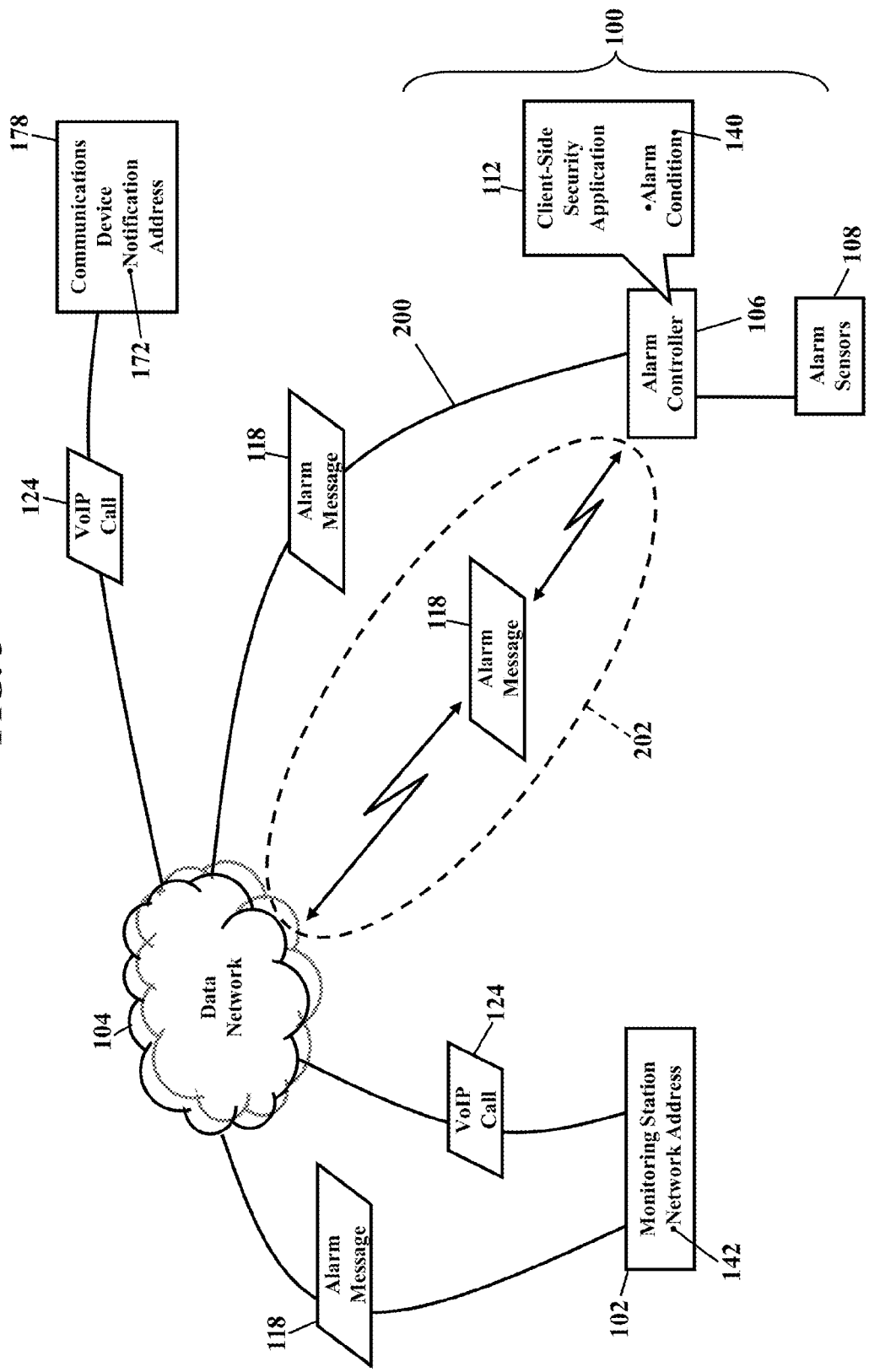
FIGS. 5-11 are even more detailed schematics illustrating the exemplary embodiments.

FIGS. 5-11 are even more detailed schematics illustrating the exemplary embodiments. FIG. 5 illustrates the selection of a network connection to the data network 104. When the client-side security application 112 detects the alarm condition 140 from one of the sensors 108, the client-side security application 112 must connect to the data network 104 to send the alarm message 118 to the monitoring station 102. If the client-side security application 112 cannot connect to the data network 104, then the client-side security application 112 may utilize other notification architectures (as later paragraphs will explain).

FIG. 5, then, illustrates two (2) different, simultaneous connections to the data network 104. The client-side security application 112 may send the alarm message 118 over a wireline broadband network connection 200 to the data network 104. The client-side security application 112 may also send the alarm message 118 over a wireless network connection 202 to the data network 104. While exemplary embodiments may send the alarm message over both the wireline broadband network connection 200 and the wireless network connection 202, exemplary embodiments may prefer the wireline broadband network connection 200 over the wireless network connection 202. Even though technological advances may continually improve wireless data rates (e.g., bits per second), it is likely that the wireline broadband network connection 200 will be "faster" than the wireless network connection 202. That is, the wireline broadband network connection 200 may usually have a greater data rate than the wireless network connection 202. The client-side security application 112 may thus prefer to send the alarm message 118 over the fastest connection to the data network 104 to obtain emergency help as fast as possible. The faster wireline broadband network connection 200 may also provide greater clarity for the Voice-over Internet Protocol call (illustrated as reference numeral 124 in FIG. 1).

The two (2) different connections also provide redundancy. The wireline broadband network connection 200 and the wireless network connection 202 help ensure that the monitoring station 102 has two-way communications capabilities with the security system 100. Even though the wireline broadband network connection 200 may be preferable, the wireless network connection 202 provides a back-up, alternative connection to the data network 104.

The client-side security application 112 may thus continually monitor the status of the wireline broadband network connection 200 and the wireless network connection 202. When the alarm condition 140 is detected, the client-side security application 112 may first determine whether the wireline broadband network connection 200 to the data network 104 is available. When the wireline broadband network connection 200 is available, the client-side security application 112 routes the alarm message 118 over the wireline broadband network connection 200 to the network address 142 associated with the monitoring station 102. When, however, the wireline broadband network connection 200 is unavailable, the client-side security application 112 routes the alarm message 118 over the wireless network connection 202 to the network address 142. Regardless, when the monitoring station 102 receives the alarm message 118, the Voice-over Internet Protocol call 124 is established to the notification address 172, as earlier paragraphs explained.

Figure 6:
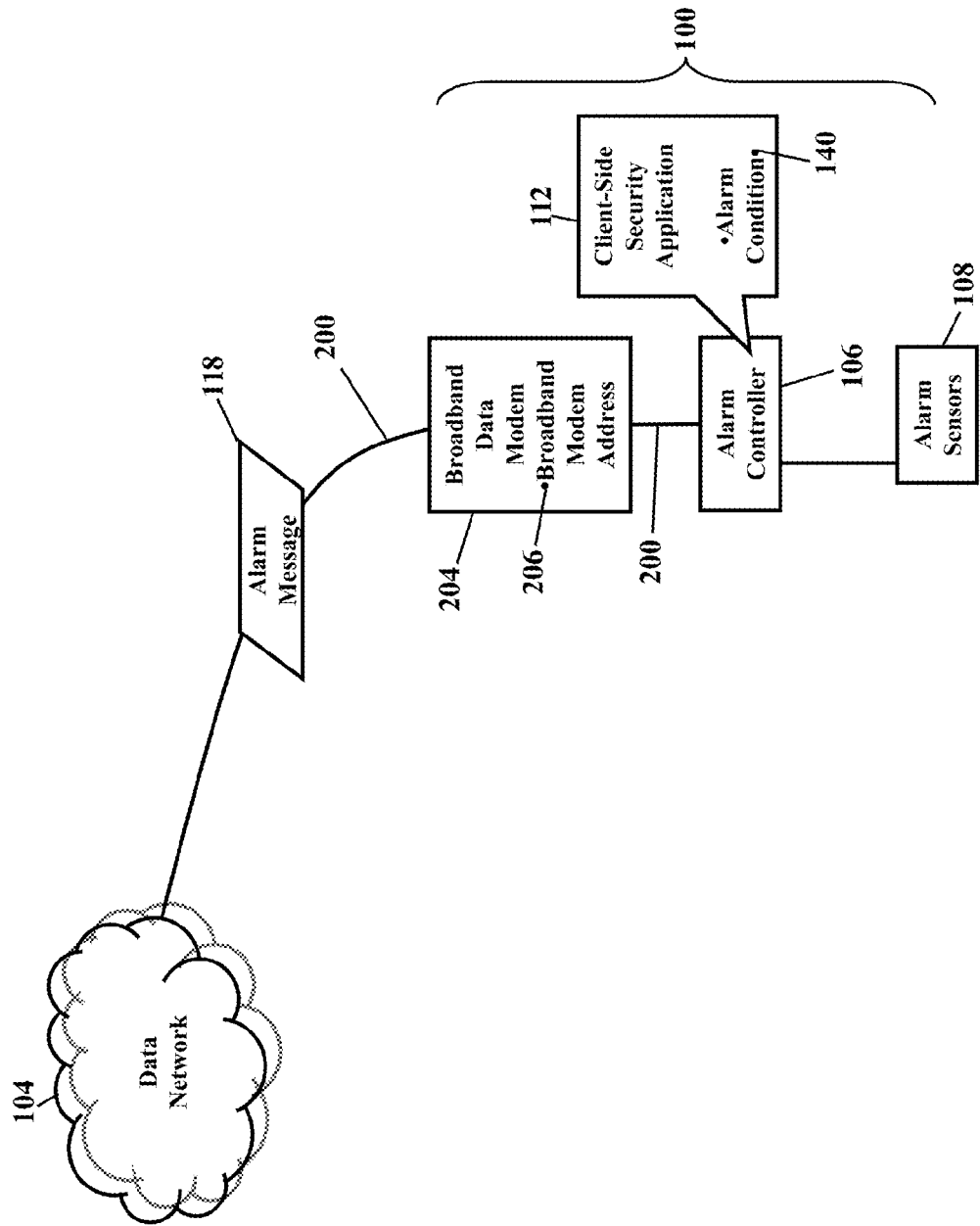

FIG. 6 is a detailed schematic illustrating the wireline broadband network connection 200, according to exemplary embodiments. The alarm controller 106 communicates with a broadband data modem 204. The broadband data modem 204 communicates with the data network 104. The broadband data modem 204 modulates and/or demodulates data that is sent to, and received from, the data network 104. The broadband data modem 204 is well known to those of ordinary skill in the art, so the architecture and operating principles of the broadband data modem 204 need not be discussed. The broadband data modem 204 may be addressable, so the broadband data modem 204 may have a unique or shared broadband modem address 206. When the alarm condition 140 is detected, and when the wireline broadband network connection 200 is available, the client-side security application 112 may route the alarm message 118 over the wireline broadband network connection 200 to the data network 104.

Figure 7:
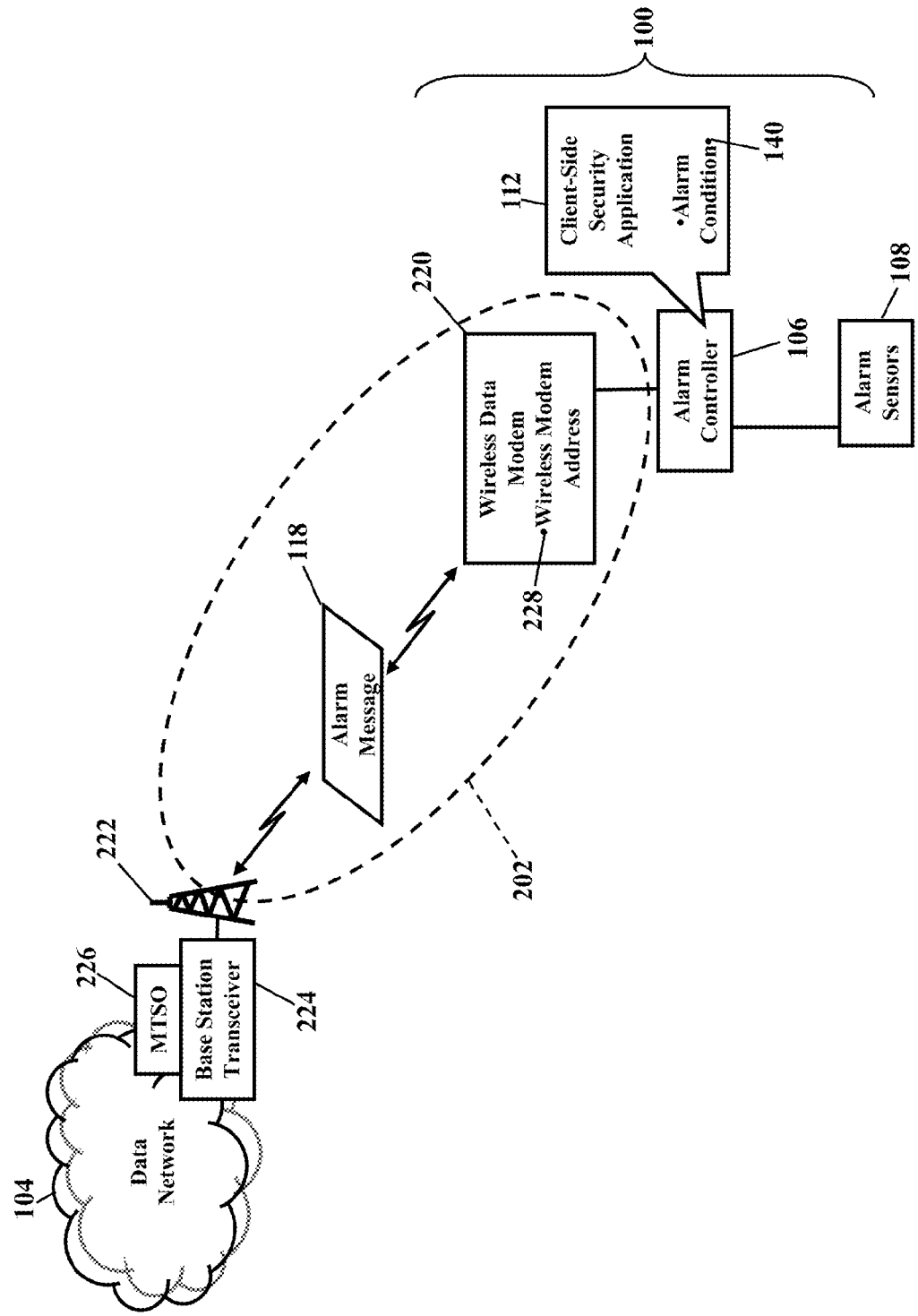

FIG. 7 is a detailed schematic illustrating the wireless network connection 202, according to exemplary embodiments. The alarm controller 106 also communicates with a wireless data modem 220. The wireless data modem 220 also communicates with the data network 104. FIG. 7 illustrates a cellular architecture, in which the wireless data modem 220 uses cellular technology to communicate with the data network 104. The wireless data modem 220 sends and receives data to an antenna 222 of a base station transceiver 224. The base station transceiver 224 communicates with a mobile telephone switching office ("MTSO") 226, and the mobile telephone switching office 226 has a data link to the data network 104. The wireless data modem 220 modulates and/or demodulates the signals that are received and sent via the base station transceiver 224. The wireless data modem 220 is again well known to those of ordinary skill in the art, so the wireless data modem 220 need not be discussed in more detail. The wireless data modem 220 may be addressable, so the wireless data modem 220 may also have a unique or shared wireless modem address 228. When the alarm condition 140 is detected, then the client-side security application 112 may route the alarm message 118 over the wireless network connection 202 to the data network 104.

Figure 8:
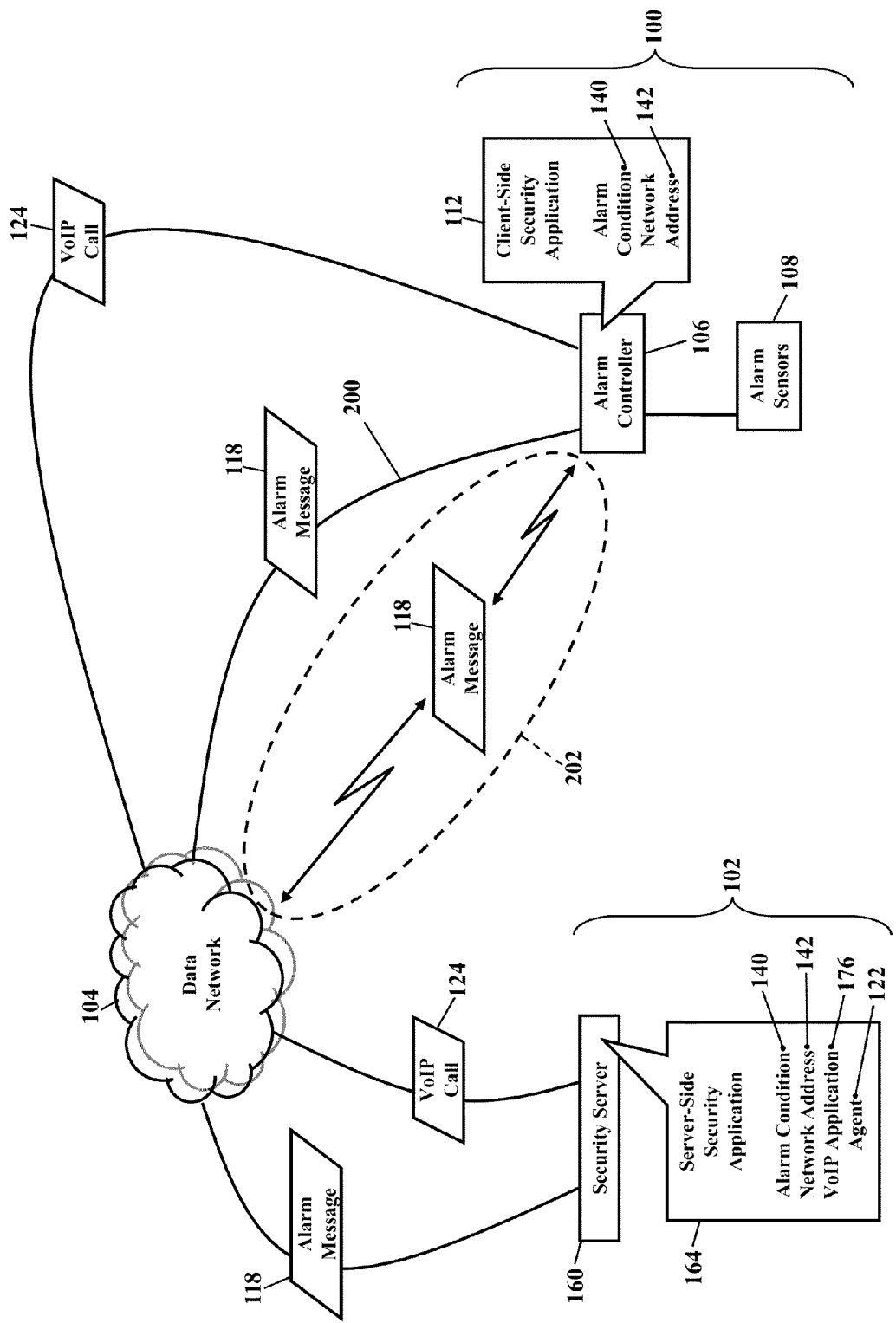

FIG. 8 is a more detailed schematic illustrating receipt of the alarm message 118. The alarm message 118 may route over the wireline broadband network connection 200 to the data network 104, or the alarm message 118 may route over the wireless network connection 202 to the data network 104. However the alarm message 118 routes, the security server 160 at the monitoring station 102 receives the alarm message 118. The server-side security application 164 then establishes the Voice-over Internet Protocol call 124.

FIG. 8, though, illustrates the Voice-over Internet Protocol call 124 routing back to the alarm controller 106. Because the alarm controller 106 maintains two-way communications capabilities with the monitoring station 102, the alarm controller 106 may have the capability to conduct the Voice-over Internet Protocol call 124. That is, the alarm controller 106 includes circuitry, componentry, and programming to conduct the Internet Protocol call 124 with the monitoring station 102. The alarm controller 106, for example, may include a microphone, speaker, and/or other components that function to process the Voice-over Internet Protocol call 124.

The server-side security application 164 may thus initiate the Voice-over Internet Protocol call 124 to the alarm controller 106. When the server-side security application 164 obtains the network address 142 from the alarm message 118, the server-side security application 164 may establish the Voice-over Internet Protocol call 124 to the alarm controller 106. The server-side security application 164 calls or invokes the Voice-over Internet Protocol ("VoIP") application 176 to establish the Voice-over Internet Protocol call 124 to the network address 142 associated with the alarm controller 106. A user at the alarm controller 106 may then converse with the computerized or human agent 122.

Figure 9:
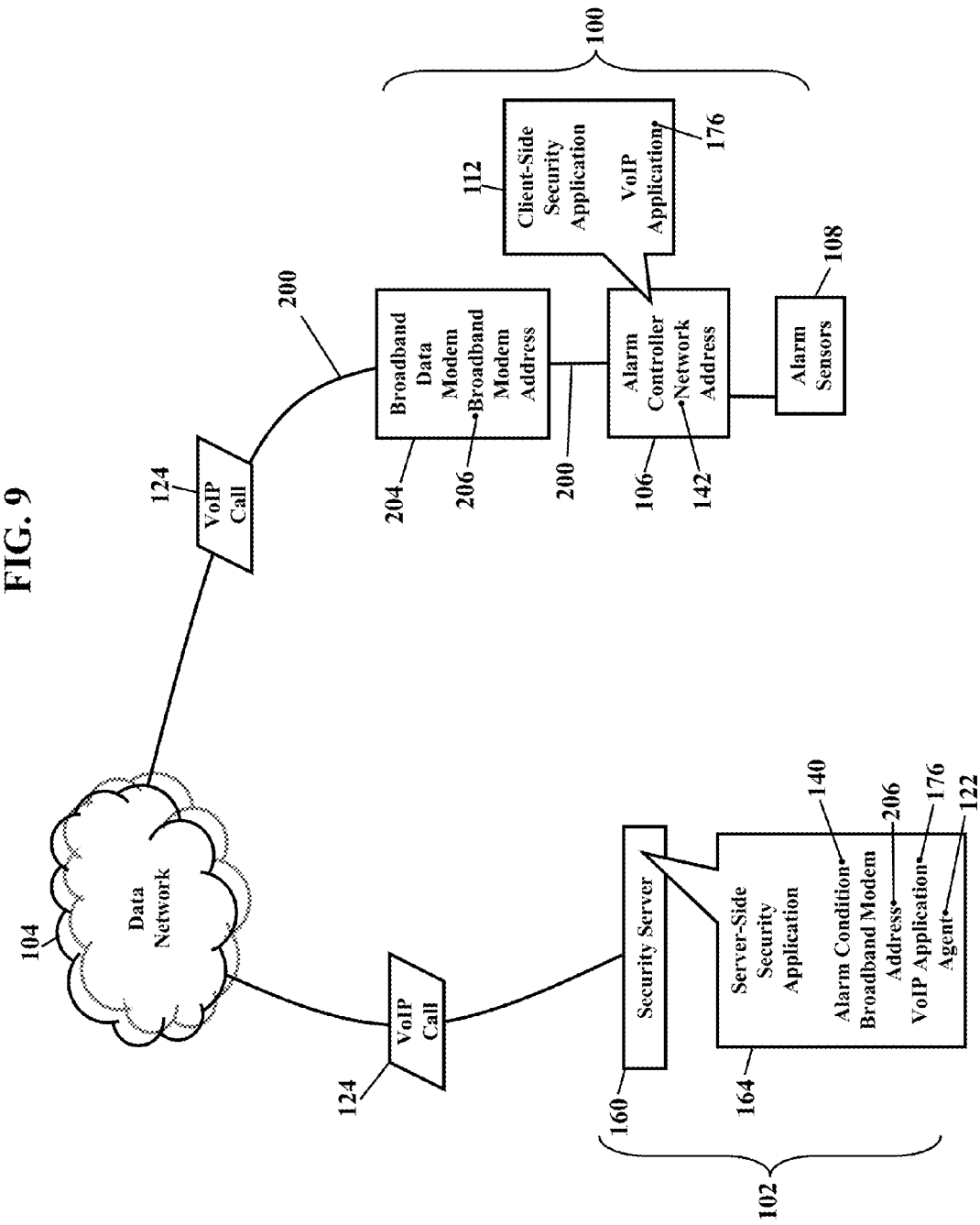

FIG. 9 is a detailed schematic illustrating the Voice-over Internet Protocol call 124 routing over the wireline broadband network connection 200, according to exemplary embodiments. When the server-side security application 164 initiates the Voice-over Internet Protocol call 124 to the alarm controller 106, the server-side security application 164 may prefer the fastest network connection that is available. Because the wireline broadband network connection 200 may usually have a greater data rate, the client-side security application 112 may thus prefer to route the Voice-over Internet Protocol call 124 over the wireline broadband network connection 200 to the broadband modem address 206 associated with the broadband data modem 204. The Voice-over Internet Protocol call 124 then routes from the broadband data modem 204 to the network address 142 associated with the alarm controller 106. The client-side security application 112 then calls or invokes the Voice-over Internet Protocol ("VoIP") application 176 to establish the Voice-over Internet Protocol call 124 with the monitoring station 102. A user at the alarm controller 106 may then converse with the computerized or human agent 122.

Figure 10:
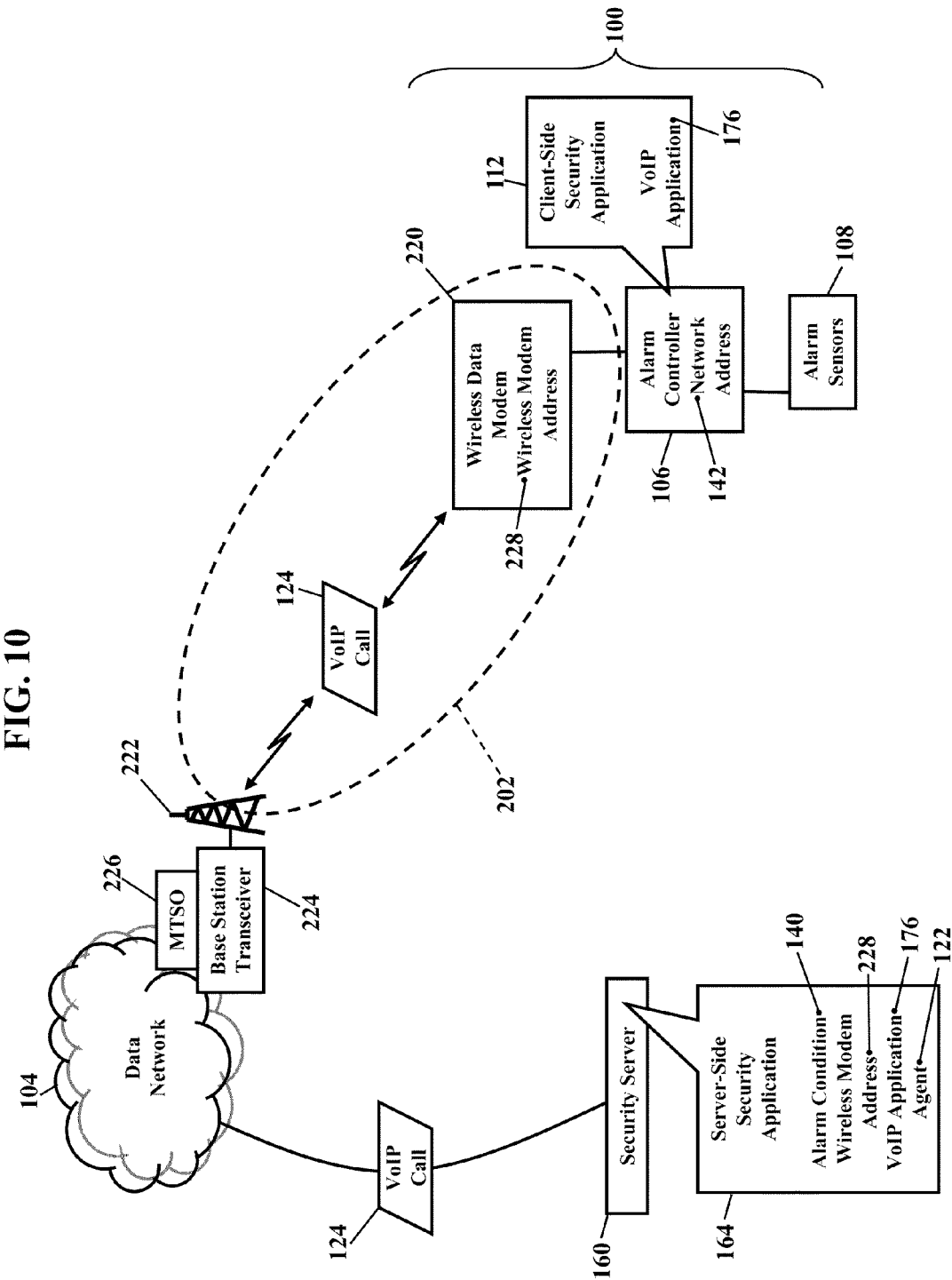

FIG. 10 is a detailed schematic illustrating the Voice-over Internet Protocol call 124 routing over the wireless network connection 202, according to exemplary embodiments. When the server-side security application 164 initiates the Voice-over Internet Protocol call 124 to the alarm controller 106, the server-side security application 164 may prefer the faster wireline broadband network connection (illustrated as reference numeral 200 in FIG. 9). When the wireline broadband network connection 200 is unavailable, though, the server-side security application 164 may utilize the wireless network connection 202. Even though the wireless network connection 202 may be "slower" (e.g., a lesser bit rate), even the available data rates from today's cellular networks are adequate to conduct the Voice-over Internet Protocol call 124. So, when the wireline broadband network connection 200 is unavailable, the server-side security application 164 may route the Voice-over Internet Protocol call 124 to the wireless modem address 228 associated with the wireless data modem 220. The Voice-over Internet Protocol call 124 then routes from the wireless data modem 220 to the network address 142 associated with the alarm controller 106. The client-side security application 112 then calls or invokes the Voice-over Internet Protocol ("VoIP") application 176 to establish the Voice-over Internet Protocol call 124 with the monitoring station 102. The user at the alarm controller 106 may then converse with the computerized or human agent 122.

Figure 11:
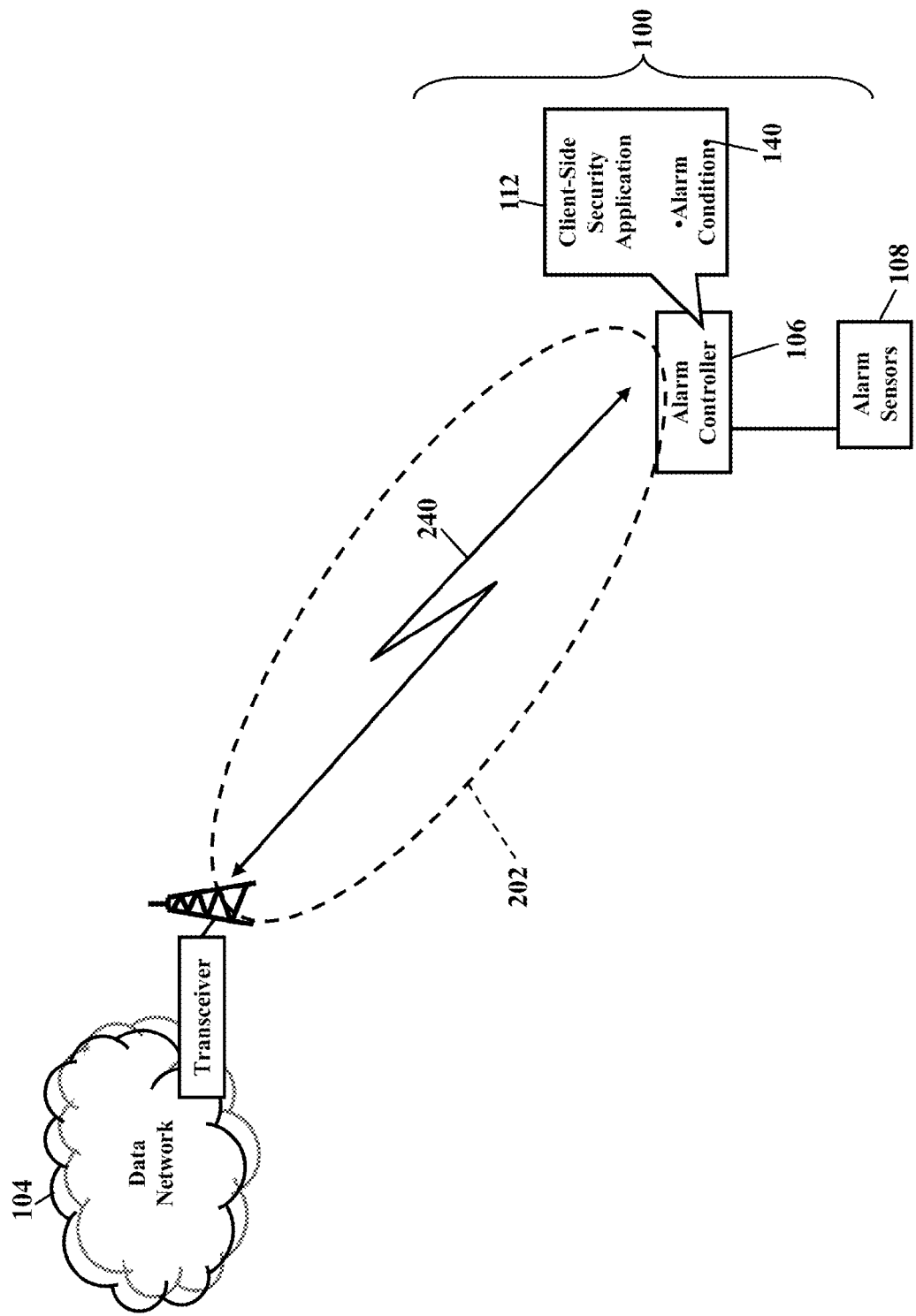

FIG. 11 is a schematic illustrating other architectures for the wireless network connection 202, according to exemplary embodiments. FIG. 7 illustrated a cellular architecture, in which the wireless data modem 220 used cellular technology to communicate with the data network 104. FIG. 11 illustrates that any wireless architecture may be used to establish a wireless communications link 240 between the alarm controller 106 and the data network 104. The alarm controller 106, for example, may establish a BLUETOOTH®, WI-FI®, or any other wireless connection with the data network 104. Any frequency within the electromagnetic spectrum may also be used.

Figure 12:
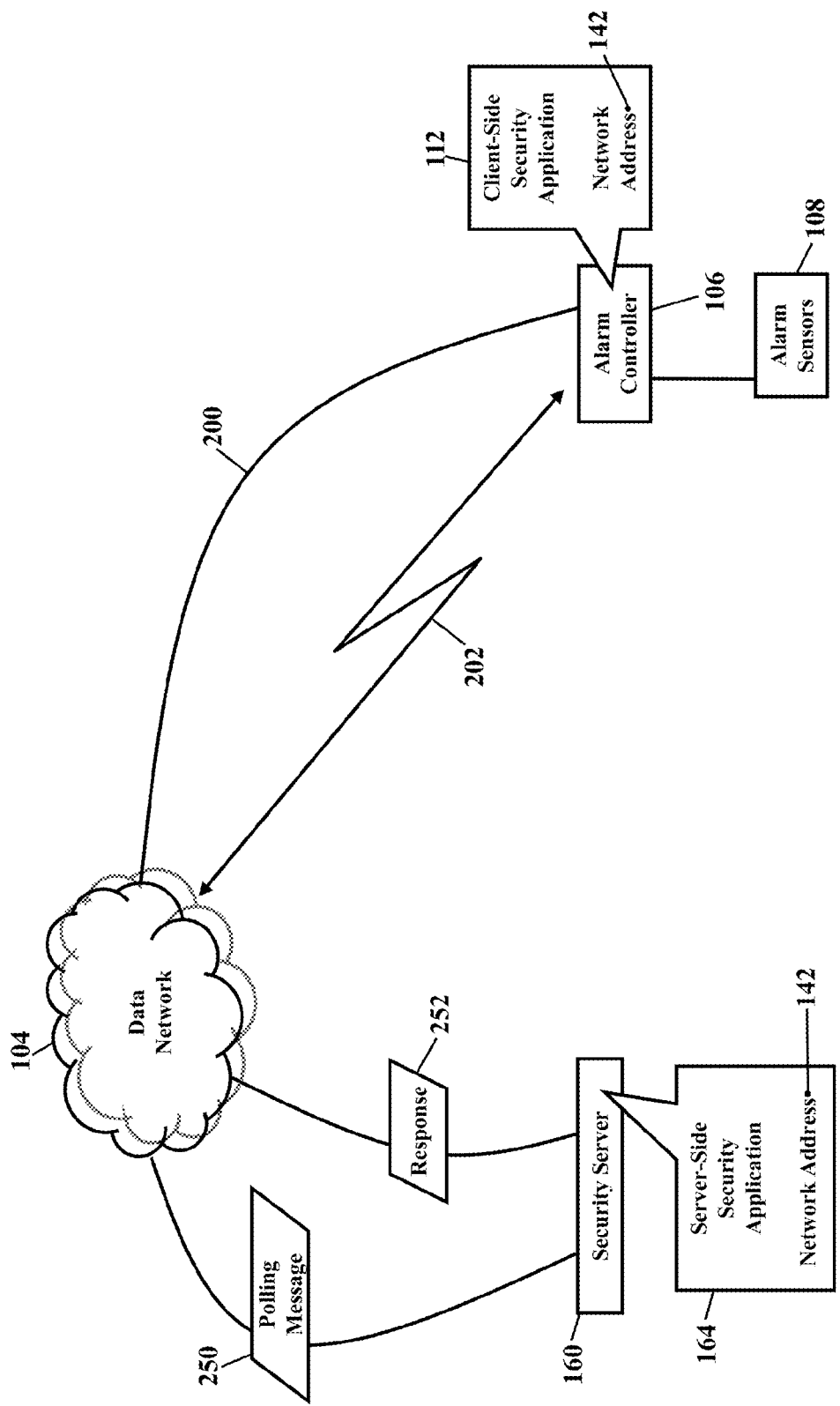
FIGS. 12-17 are schematics illustrating polling schemes, according to exemplary embodiments.

FIGS. 12-15 are more detailed schematics illustrating the exemplary embodiments. FIG. 12 illustrates a polling scheme to determine the status of the wireline broadband network connection 200 and the wireless network connection 202. The server-side security application 164 may periodically send polling messages to the alarm controller 106. Because the alarm controller 106 has the two (2) different network connections (the wireline broadband network connection 200 and the wireless network connection 202), exemplary embodiments may poll for the availability of each network connection.

FIG. 12, for example, illustrates a polling message 250. The polling message 250 routes from the server-side security application 164 into and through the data network 104. The polling message 250 routes to the network address 142 associated with the alarm controller 106. When the alarm controller 106 receives the polling message 250, the alarm controller 106 sends a response 252. The response 252 communicates through the data network 104 to the server-side security application 164 operating in the security server 160. When the response 252 is received, the server-side security application 164 knows or infers that that the alarm controller 106 is online and communicating.

Even though the response 252 is received, the server-side security application 164 does not know which network connection is available. Even though the alarm controller 106 is online and communicating, the server-side security application 164 may not know whether the wireline broadband network connection 200 is available, or whether the back-up wireless network connection 202 was used to route the response 252. Which network connection is available may be important when routing the Voice-over Internet Protocol call (illustrated as reference numeral 124 in FIG. 1) to the alarm controller 106.

Figure 13:
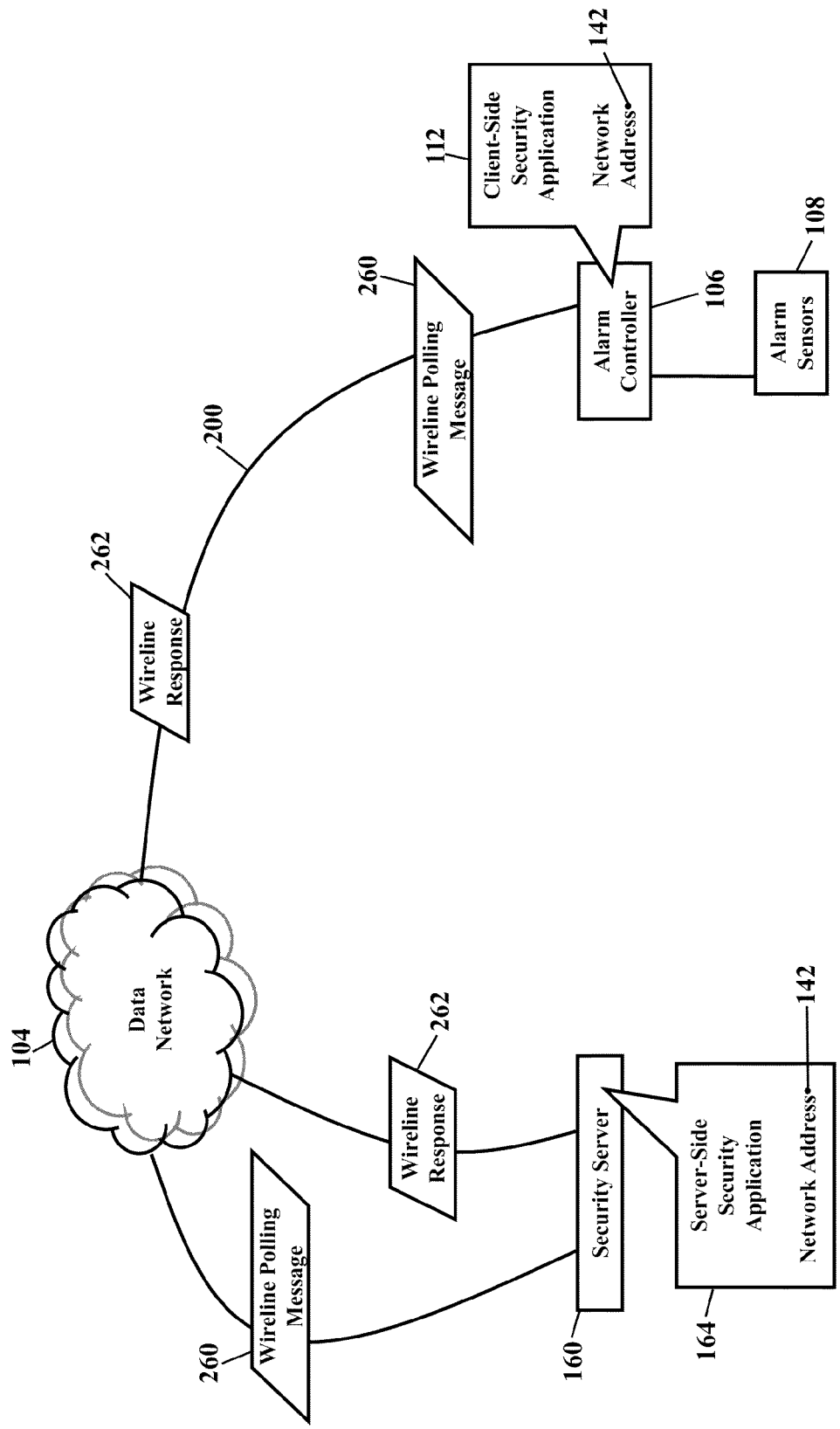
Figure 14:
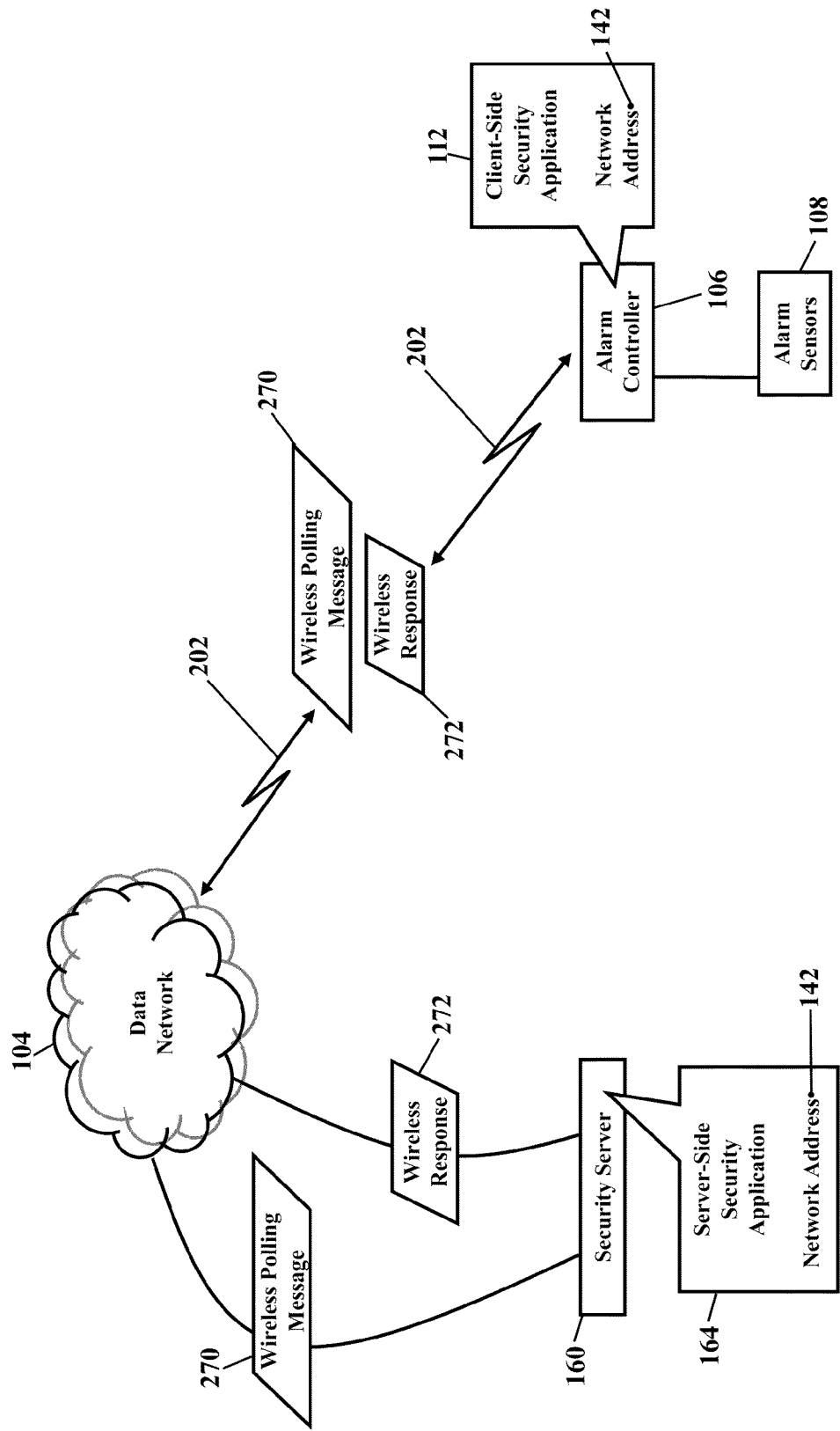

FIGS. 13 and 14, then, illustrate two (2) different polling schemes. Here separate polling messages may be sent to the alarm controller 106. FIG. 13 illustrates a wireline polling message 260 routing from the server-side security application 164, through the data network 104, and downstream over the wireline broadband network connection 200 to the network address 142 associated with the alarm controller 106. When the alarm controller 106 receives the wireline polling message 260, the alarm controller 106 sends a wireline response 262. The wireline response 262 communicates upstream over the wireline broadband network connection 200, through the data network 104, and to the server-side security application 164 operating in the security server 160. When the wireline response 262 is received, the server-side security application 164 knows that the wireline broadband network connection 200 is online and available.

FIG. 14 illustrates a wireless polling message 270. The wireless polling message 270 routes from the server-side security application 164, through the data network 104, and over the wireless network connection 202 to the network address 142 associated with the alarm controller 106. When the alarm controller 106 receives the wireless polling message 270, the alarm controller 106 sends a wireless response 272. The wireless response 272 communicates over the wireless network connection 202 to the data network 104 and to the server-side security application 164 operating in the security server 160. When the wireless response 272 is received, the server-side security application 164 knows that the wireless network connection 202 is online and available.

The reliability of the polling schemes illustrated in FIGS. 12-14 depends on fresh information. If the polling scheme is infrequent, then the server-side security application 164 may not know the current availability of the alarm controller 106. Should the server-side security application 164 have to establish the Voice-over Internet Protocol call 124 to the alarm controller 106, outdated or stale information could delay the call 124. Exemplary embodiments may thus periodically perform any of the polling schemes illustrated in FIGS. 12-14. The server-side security application 164, for example, may send the wireline polling message 260 (illustrated in FIG. 13) and then wait for receipt of the wireline response 262. After the wireline polling message 260 is sent, the server-side security application 164 may send the wireless polling message 270 (illustrated in FIG. 14) and then wait for receipt of the wireless response 272. The server-side security application 164 may sequentially send the wireline polling message 260 and then the wireless polling message 270 according to a predetermined or random schedule. A timer may be initiated to countdown from a predetermined amount of time before a sequential polling message is sent. If either response 262 and/or 272 is received, the timer may be reset and the predetermined or random schedule resumed.

Each response indicates status. When the server-side security application 164 tests the availability of the wireline broadband network connection 200, the wireline response 262 indicates an available status of the wireline broadband network connection 200. The wireless response 272 similarly indicates that the wireless network connection 202 is online and available. If a response is not received, though, the server-side security application 164 may resend either the wireline polling message 260 and/or the wireless polling message 270. The server-side security application 164 may wait a predetermined amount of time before resending either the wireline polling message 260 and/or the wireless polling message 270.

Figure 15:
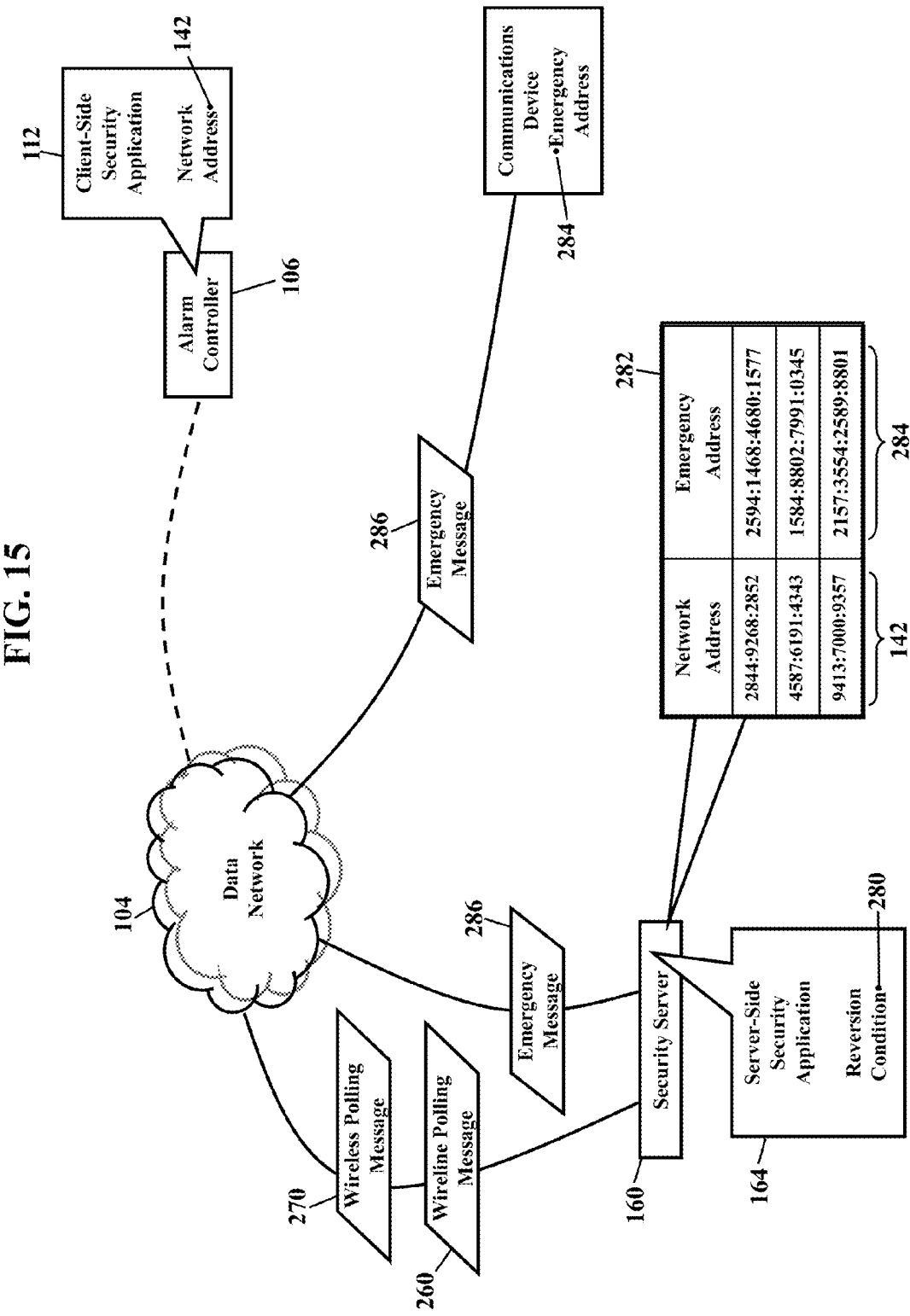
Figure 16:
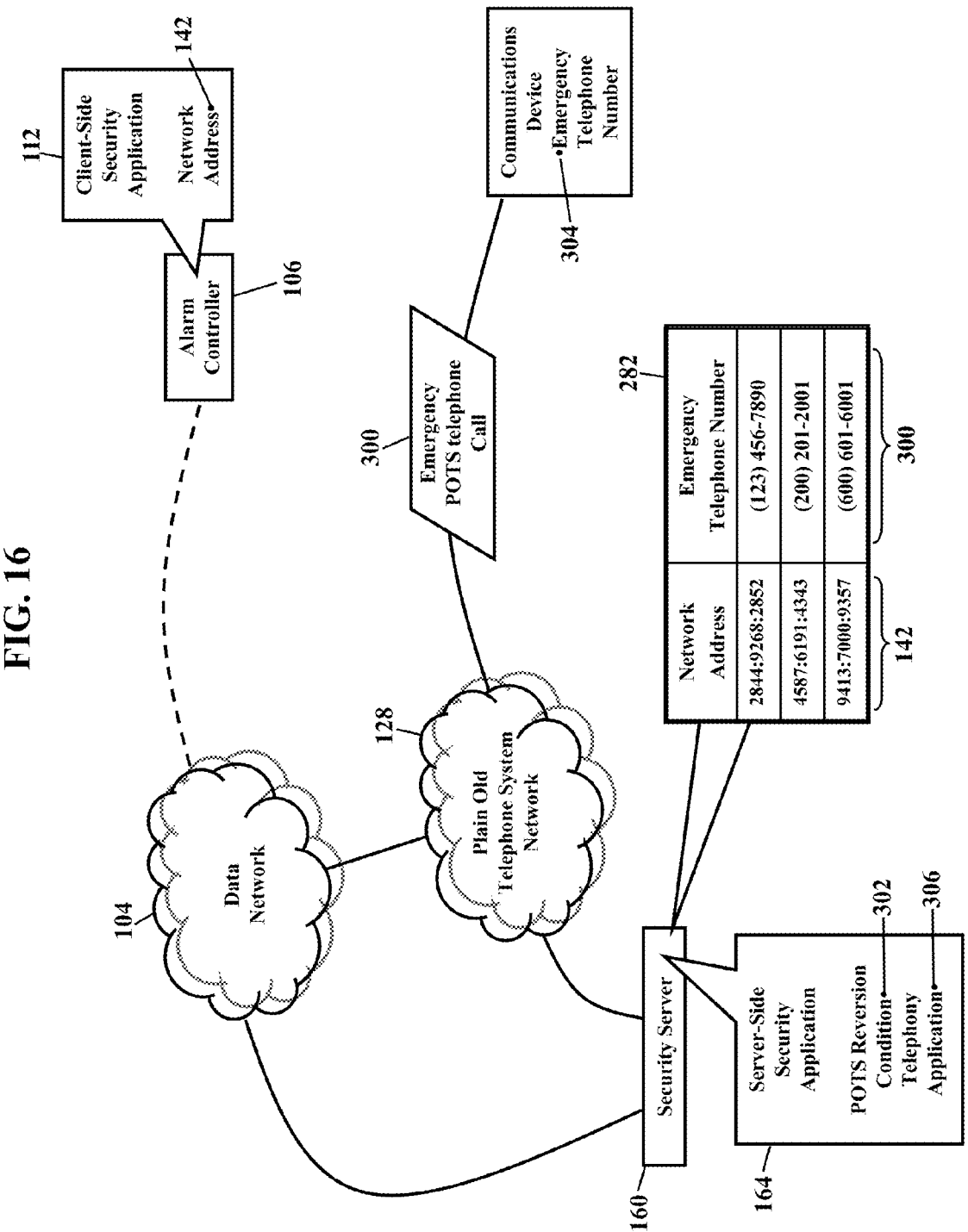

FIGS. 15 and 16 illustrate a reversion condition 280. If responses are not received to the wireline polling message 260 or to the wireless polling message 270 (perhaps after one or multiple attempts), then the server-side security application 164 may flag a communication error. That is, some type of network problem or error is preventing the server-side security application 164 from communicating with the client-side security application 112 operating in the alarm controller 106. Here then the server-side security application 164 enters a reversion condition 280. The server-side security application 164 queries a reversion data table 282. The reversion data table 282 is illustrated as being locally stored in the security server 160, but the reversion data table 282 may be remotely stored and accessed via the data network 104. The reversion data table 282 associates the network address 142 of the alarm controller 106 to an emergency address 284. The server-side security application 164 retrieves the emergency address 284 and sends an emergency message 286 to the emergency address 284. The emergency message 286 informs a human or computer application that communication has been lost with the alarm controller 106. Diagnostic or troubleshooting procedures may commence.

FIG. 16 illustrates an emergency POTS telephone call 300. When the server-side security application 164 fails to receive the wireline response 262 and/or the wireless response 272 (illustrated, respectively, in FIGS. 13 and 14), here the server-side security application 164 may enter a POTS reversion condition 302. The server-side security application 164 again queries the reversion data table 282. The server-side security application 164 retrieves an emergency telephone number 304 that is associated with the network address 142 of the alarm controller 106. The server-side security application 164 calls or invokes a telephony application 306 and initiates the plain old telephone ("POTS") call 300 to the emergency telephone number 304. The emergency POTS telephone call 300 is established along the plain old telephone system 128 to the emergency telephone number 304. The emergency POTS telephone call 300 alerts the emergency telephone number 304 of a failed communication attempt to the network address 142 of the alarm controller 106.

Figure 17:
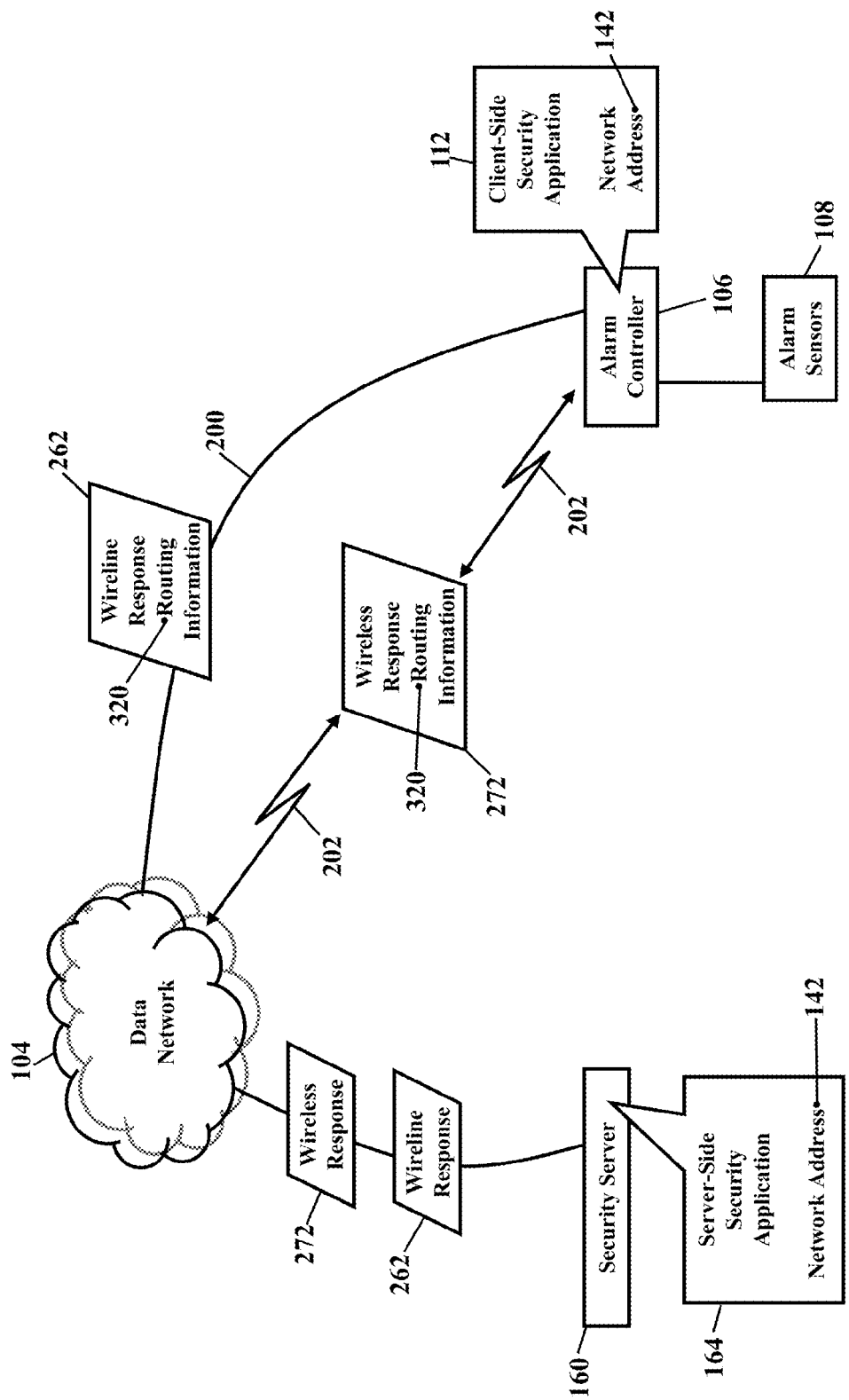

FIG. 17 is a schematic further illustrating the polling scheme, according to exemplary embodiments. Here responses to polling messages may indicate a network path that was used to connect to the data network 104. When the alarm controller 106 receives the wireline polling message (illustrated as reference numeral 260 in FIG. 13), the alarm controller 106 sends the wireline response 262. Here, though, the wireline response 262 includes data or information that identifies the wireline broadband network connection 200. That is, the wireline response 262 includes routing information 320 that indicates the wireline broadband network connection 200 was used to route the wireline response 262 from the alarm controller 106 to the data network 104. When the server-side security application 164 receives the wireline response 262, the server-side security application 164 thus knows that the wireline broadband network connection 200 is online and available.

The wireless response 272 may also include the routing information 320. When the alarm controller 106 sends the wireless response 272, here the routing information 320 indicates that the wireless network connection 202 was used to route the wireless response 272 from the alarm controller 106 to the data network 104. When the server-side security application 164 receives the wireless response 272, the routing information 320 informs the server-side security application 164 that the wireless network connection 202 is online and available.

Figure 18:
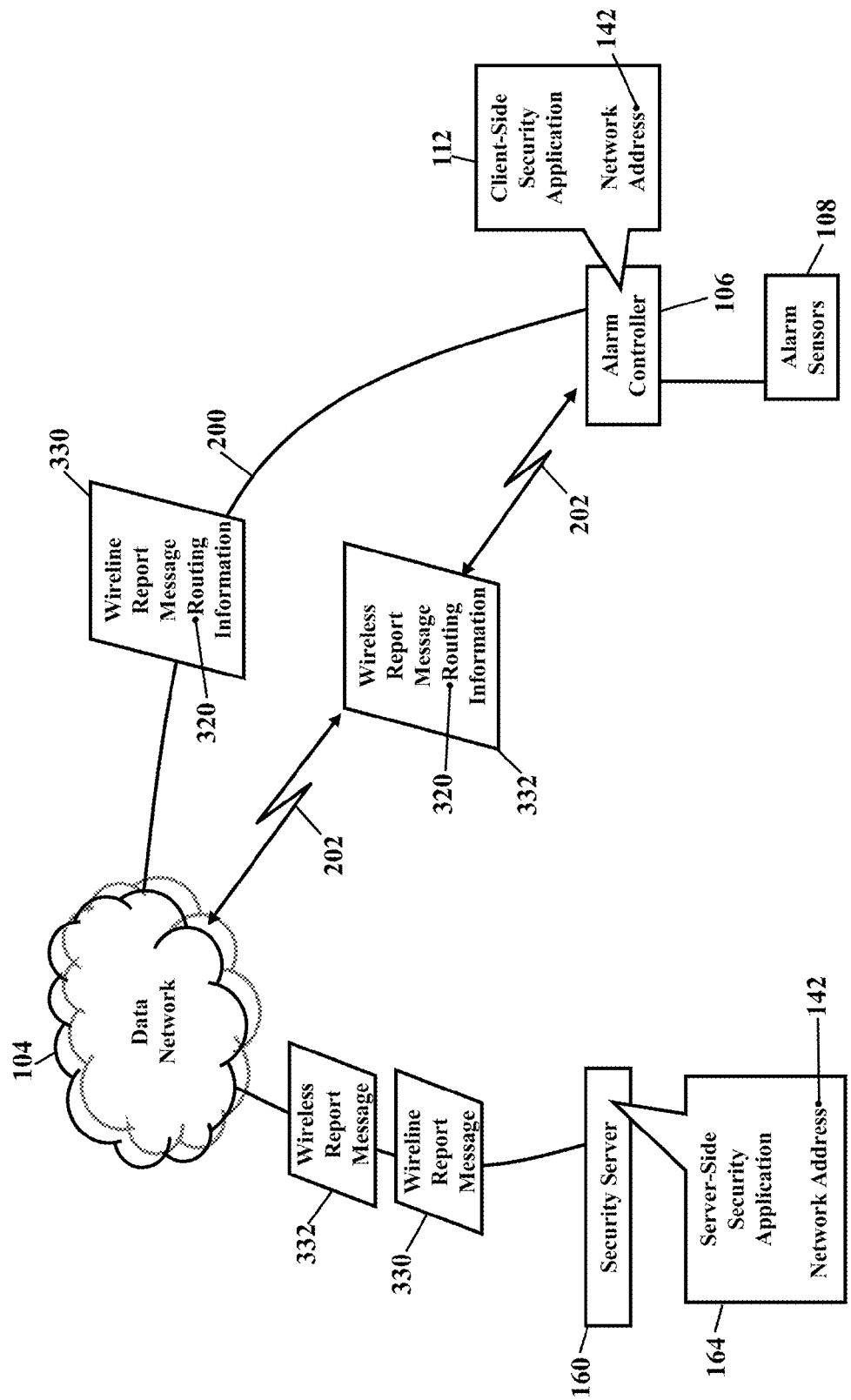
FIG. 18 is a schematic illustrating a self-reporting feature, according to exemplary embodiments.

FIG. 18 is a schematic illustrating a self-reporting feature, according to the exemplary embodiments. Here the client-side security application 112 may periodically and automatically self-report its online status to the security server 160. The client-side security application 112, for example, may automatically send a wireline report message 330 over the wireline broadband network connection 200 to the data network 104. The wireline report message 330 may include the routing information 320 that indicates the wireline broadband network connection 200 is online and available. The client-side security application 112 may periodically and automatically send a wireless report message 332 over the wireless network connection 202 to the data network 104. The wireless report message 332 may also include the routing information 320 that indicates that the wireless network connection 202 is online and available. The client-side security application 112 may thus include service logic to simultaneously maintain packetized (e.g., Internet Protocol) communications with the monitoring station 102 via both the wireline broadband network connection 200 and the wireless network connection 202. Network connectivity to each connection may be periodically confirmed as needed or desired (such as multiple times every hour).

Figure 19:
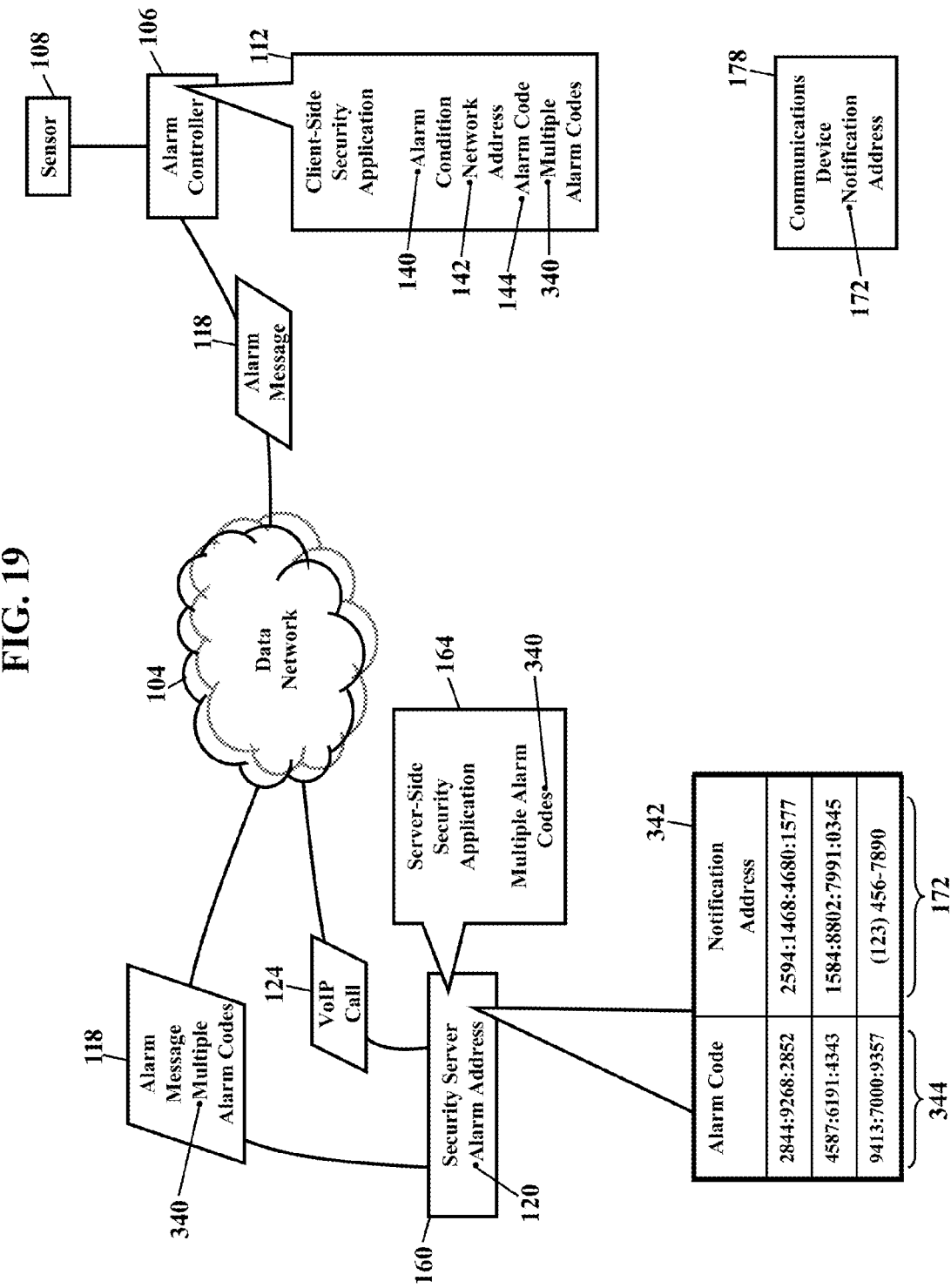
FIGS. 19 and 20 are schematics illustrating multiple alarm codes, according to exemplary embodiments.
Figure 20:
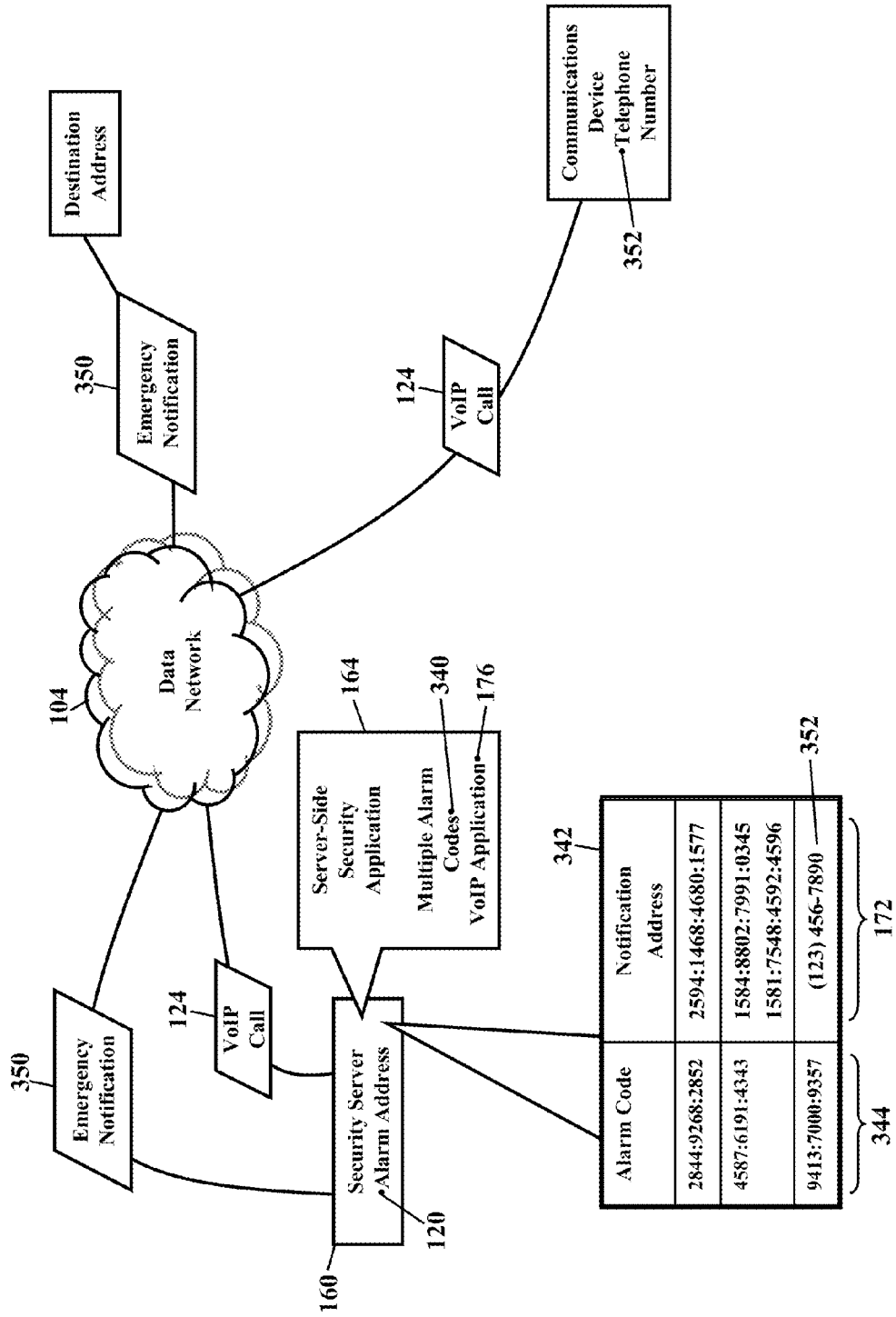

FIGS. 19 and 20 are schematics illustrating multiple alarm codes 340, according to exemplary embodiments. When the client-side security application 112 detects the alarm condition 140, the client-side security application 112 sends the alarm message 118 to the alarm address 120 associated with the security server 160. The alarm message 118 may also include data that describes the alarm condition 140, such as the alarm code 144 associated with the sensor 108. FIG. 19, though, illustrates multiple alarm codes 340. When a catastrophic, emergency event occurs, multiple sensors may detect multiple alarm conditions. A fire, for example, may be detected by a heat sensor and by a smoke sensor. If a window breaks (perhaps due to the heat or an impact), a sound sensor may detect the sonic frequencies of breaking glass. The alarm message 118, then, may include information that describes the multiple alarm codes 340 (e.g., heat sensor, smoke sensor, and sound/glass sensor). When the security server 160 receives the alarm message 118, the server-side security application 164 receives information describing the multiple alarm codes 340.

The server-side security application 164 may then consult an address notification table 342. The address notification table 342 is illustrated as being locally stored in the security server 160, but the address notification table 342 may be remotely stored from the security server 160. Regardless, the address notification table 342 maps, associates, or otherwise relates each alarm code 144 to the corresponding notification address 172. The address notification table 342 defines associations between a plurality of the alarm codes 144 to a plurality of the network addresses 172. Each unique alarm code 144 may have a different notification address 172. When the server-side security application 164 receives the alarm message 118, the server-side security application 164 reads each alarm code 144 of the multiple alarm codes 340. The server-side security application 164 queries the address notification table 342 for each individual alarm code 144 obtained from the alarm message 118. The server-side security application 164 retrieves the corresponding notification address 172 associated with each alarm code 144. Each alarm code 144 may thus have a different notification address 172.

As FIG. 20 illustrates, the server-side security application 164 may then alert each notification address 172. The server-side security application 164 may send multiple emergency notifications 350, with each emergency notification 350 destined for the notification address 172 associated with each alarm code 144. Each emergency notification 350 may be of any type of message, such as email, page, text, facsimile, and/or voice. If the alarm code 144 is associated with a heat sensor, for example, the emergency notification 350 may be sent to the notification address 172 associated with a local fire department. If the alarm code 144 is associated with a sound sensor, the emergency notification 350 may be sent to the notification address 172 associated with a local police department. The alarm code 144 may even be associated with multiple notification addresses 172. The alarm code 144 for the sound sensor may be associated with the notification addresses 172 for the local police department and for an emergency medical provider. As FIG. 20 also illustrates, when the notification address 172 is a telephone number 352, the server-side security application 164 may invoke the Voice-over Internet Protocol ("VoIP") application 176 to establish the Voice-over Internet Protocol call 124 to the telephone number 352.

Figure 21:
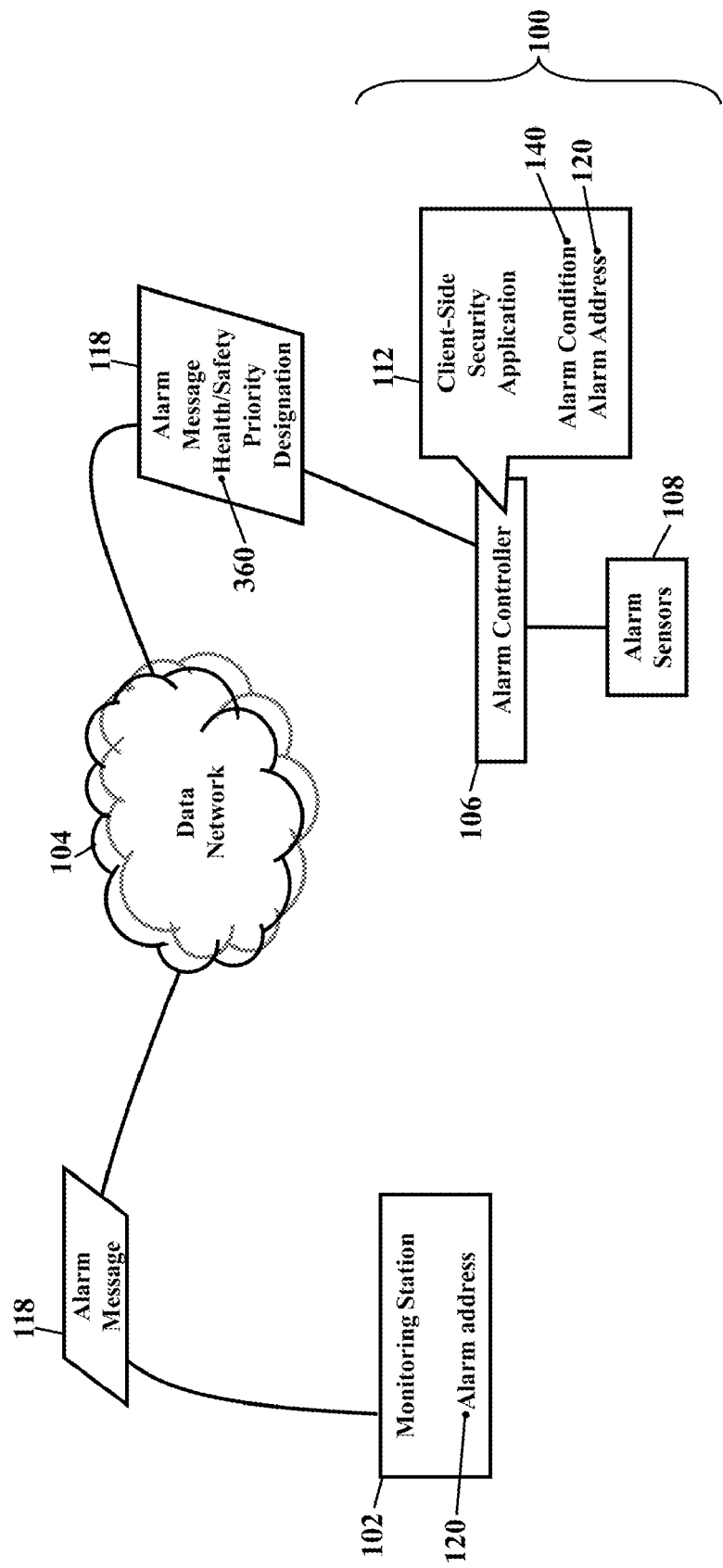
FIG. 21 is a schematic illustrating a priority scheme, according to exemplary embodiments.

FIG. 21 is a schematic illustrating a priority scheme, according to exemplary embodiments. When the alarm condition 140 is detected, the client-side security application 112 sends the alarm message 118 into and through the data network 104 to the alarm address 120 associated with the monitoring station 102. As the alarm message 118 routes along the data network 104, though, the alarm message 118 may encounter congestion. Network processing delays within the data network 104 may slow the propagation of the alarm message 118, thus delaying a response time from the monitoring station 102.

Exemplary embodiments may thus prioritize the alarm message 118. When the client-side security application 112 sends the alarm message 118, the alarm message 118 may contain a health/safety priority designation 360. The health/safety priority designation 360 alerts the data network 104 that the packets associated with the alarm message 118 have processing priority over all other packet traffic. When the alarm message 118 encounters a network bottleneck, the health/safety priority designation 360 allows the alarm message 118 to move to a front of a queue (e.g., last in, first out).

The health/safety priority designation 360 may have a standardized format that all network service providers, and all network equipment, recognize. The header portion 168 of the alarm message 118, for example, may contain a standardized bit sequence that prioritizes a packet over all other traffic in the data network 104. When multiple messages are encountered, with each message having the health/safety priority designation 360, then rules may be established for processing competing alarm messages 118. An earliest date/time stamp, for example, may prioritize an alarm message over later-sent alarm messages.

Figure 22:
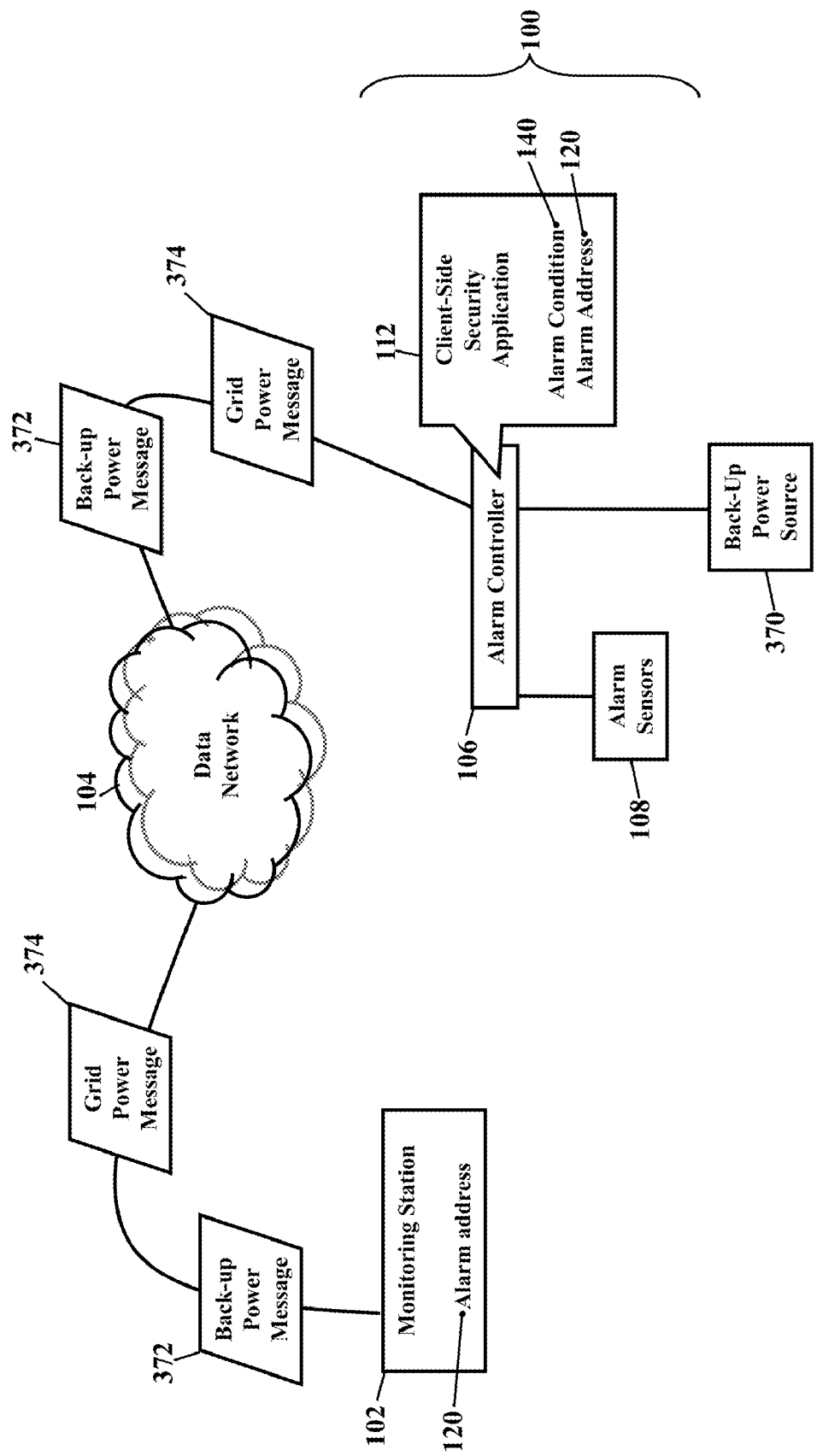
FIG. 22 is a schematic illustrating a back-up power source, according to exemplary embodiments.

FIG. 22 is a schematic illustrating a back-up power source 370, according to exemplary embodiments. The security system 100 and the alarm controller 106 may receive electrical power from a power source (such as the conventional electric grid). An electrical power failure, though, could prevent the alarm controller 106 from detecting the alarm condition 140 and from sending the alarm message 118 to obtain help. The alarm controller 106, then, may switch to the back-up power source 370. The back-up power source 370 may be a solar panel, a battery, a fuel cell, a generator, and/or any means for providing electrical current and voltage to the alarm controller 106. When a local power failure occurs, the client-side security application 112 may thus utilize packetized communications over the data network 104 to inform the monitoring station 102 of the local power failure. When electrical power is provided by the back-up power source 370, the client-side security application 112 may send a back-up power message 372 over the data network 104 to inform the monitoring station 102. When electrical power from the electric grid has been restored, the client-side security application 112 may send a grid power message 374 over the data network 104 to inform the monitoring station 102.

Figure 23:
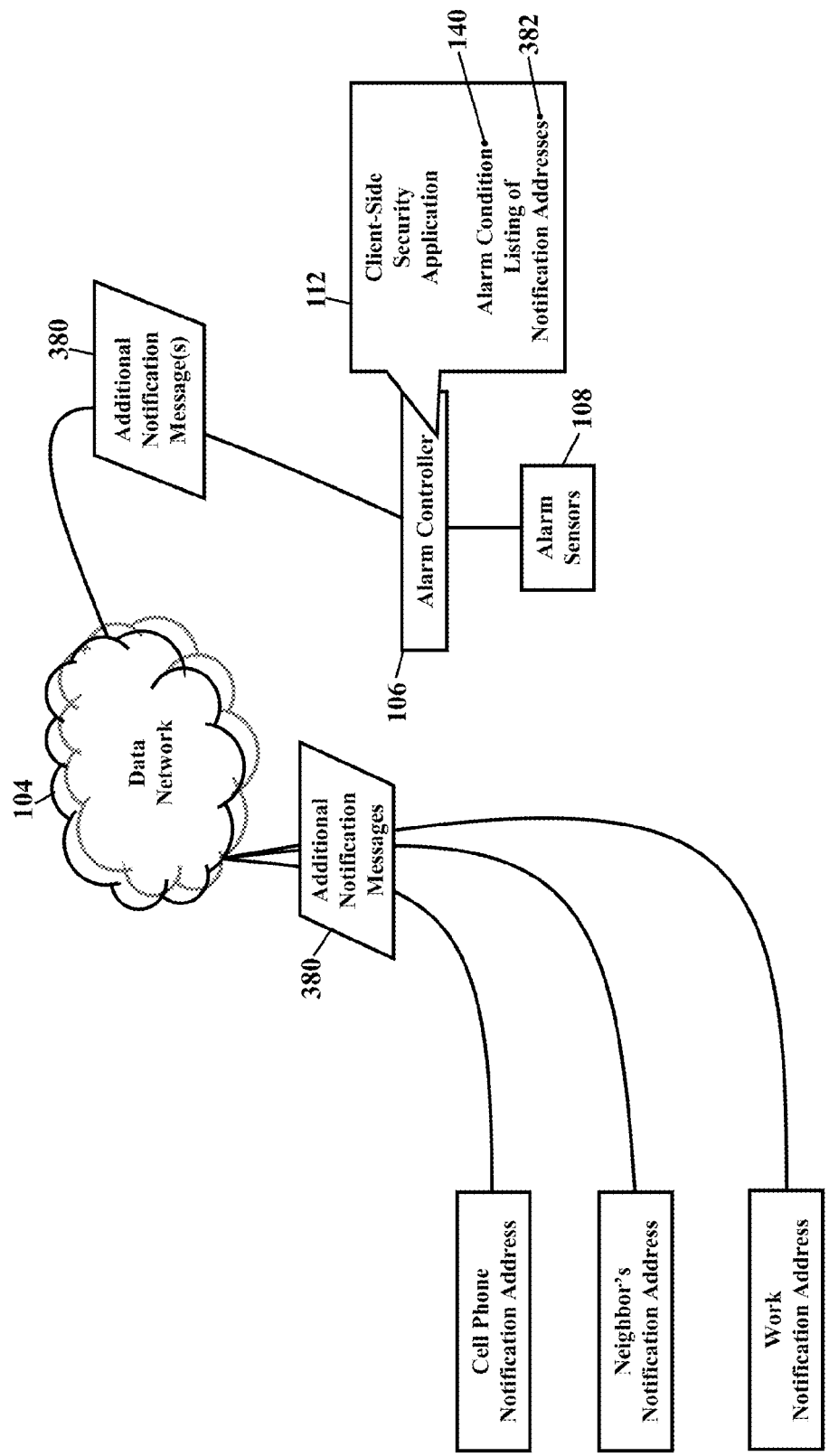
FIG. 23 is a schematic illustrating additional notification messages, according to exemplary embodiments.

FIG. 23 is a schematic illustrating additional notification messages 380, according to exemplary embodiments. When the alarm controller 106 detects the alarm condition 140, FIG. 23 illustrates how the client-side security application 112 may send one or more additional notification messages 380. These additional notification messages 380 may be sent to any desired destination, such as a cell phone, a neighbor, a parent or child, or a work address. The client-side security application 112 may access a listing 382 of notification addresses, and the additional notification messages 380 may be sent to one or more of the entries in the listing 382 of notification address. Here, then, exemplary embodiments allow the client-side security application 112 to be configured to automatically send any type of message (SMS, MMS, email, page, text) or call when the alarm condition 140 occurs. The client-side security application 112 may additionally or alternatively be configured to automatically send any type of message when any other event occurs, such as motion detection, water sensing, or momentary threshold detection. The additional notification messages 380 may additionally or alternatively be sent from the server-side security application operating in the security server (illustrated, respectively, as reference numerals 164 and 160 in FIG. 3). When the server-side security application 164 receives the alarm message 118, the server-side security application 164 may retrieve the listing 382 of notification addresses from local or remote memory. The server-side security application 164 may then send the additional notification messages 380 to each entry in the listing 382 of notification addresses.

The client-side security application 112 and/or the server-side security application 164 may be remotely accessed. Because both the client-side security application 112 and the server-side security application 164 may communicate with the data network 104 (such as the Internet), either application may be remotely accessed. When a customer is away from home, the customer may remotely establish communication (such as Internet Protocol communication) with the client-side security application 112 operating in the customer's home. The customer, for example, may download/access a web portal page using a computer, phone, or any communications device. Once the customer is authenticated (perhaps using a username and password), communication with the client-side security application 112 may be established. Programming intelligence in the web portal page may automatically determine if communication can be established using the wireline broadband network connection 200. If the wireline broadband network connection 200 is unavailable, then communication may be established using the wireless network connection 202 (as earlier paragraphs explained).

Remote configuration is also permitted. Because the customer may remotely access either the client-side security application 112 and/or the server-side security application 164, the customer may also remotely configure either application. The customer, for example, may remotely arm and disarm the security system 100. The customer may remotely change the security system's parameters, such as disabling ("turning off") a motion detector or changing the temperature threshold of a temperature sensor. The customer may also access stored digital video data captured by a digital video camera. The customer, for example, may request and remotely receive live streaming video from the camera. If the security system 100 includes a local archive for storing video data, then the customer may request and remotely receive archived streaming video from the camera.

Local access and configuration are permitted. The alarm controller 106 may include a user interface (such as a keypad and/or display). Local access to the alarm controller 106 may still require username/password authentication. Once authenticated, though, the customer may locally configure the client-side security application 112. The customer may arm and disarm the security system 100, change parameters, change the notification addresses 172, or perform any housekeeping procedures. The customer may also access stored digital video data captured by a digital video camera, and the customer may request and view live and archived streaming video from the camera.

Figure 24:
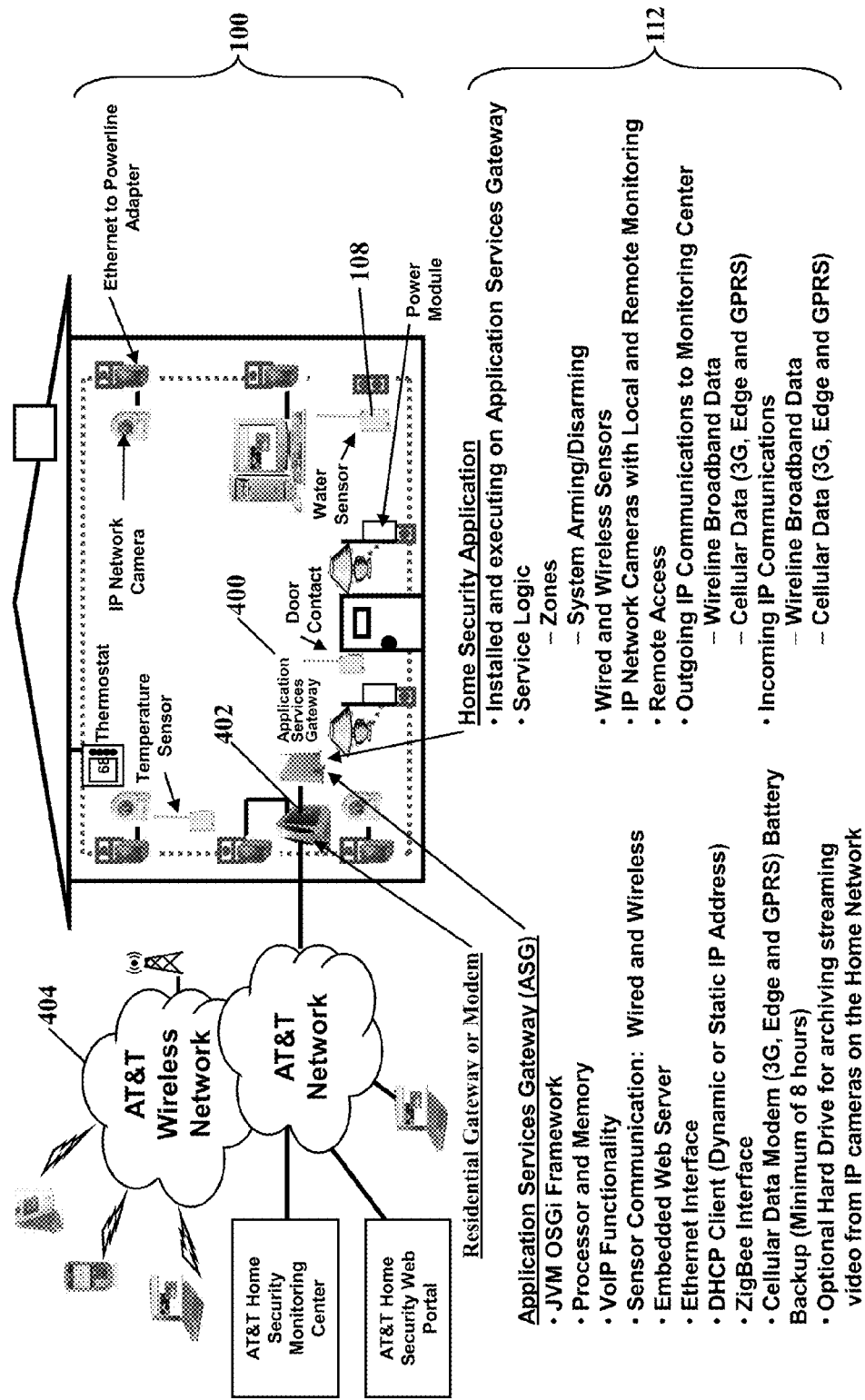
FIGS. 24 and 25 are schematics illustrating more detailed operating environments, according to exemplary embodiments.
Figure 25:
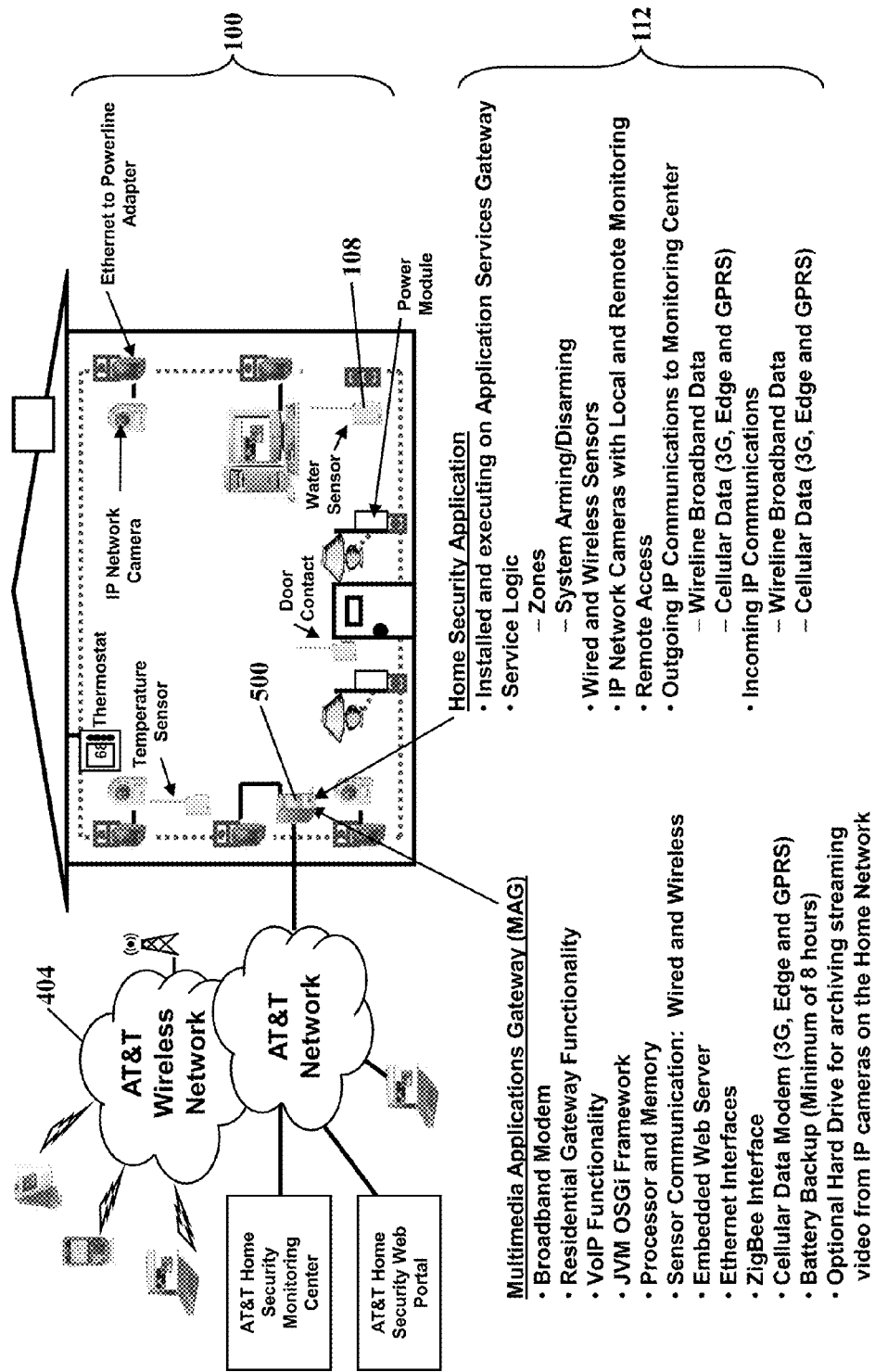

FIGS. 24 and 25 are schematics illustrating more detailed operating environments, according to exemplary embodiments. Here the security system 100 operates within a customer's residence, and the client-side security application 112 monitors the sensors 108 installed within the customer's residence. FIG. 24 illustrates the client-side security application 112 as being locally stored and maintained within an application services gateway 400. The application services gateway 400 interfaces with a residential gateway 402, and the residential gateway 402 may include the broadband data modem (illustrated as reference numeral 204 in FIG. 9). The broadband data modem 204 provides wireline access to the data network 104 via the wireline broadband network connection 200. The residential gateway 402 may also include the wireless data modem (illustrated as reference numeral 220 in FIG. 10), which interfaces with a wireless network 404 using the wireless network connection 202.

FIG. 25 illustrates a multimedia applications gateway 500. The client-side security application 112 is illustrated as being locally stored and maintained within the multimedia applications gateway 500. The multimedia applications gateway 500 includes the broadband data modem (illustrated as reference numeral 204 in FIG. 9) and/or the wireless data modem (illustrated as reference numeral 220 in FIG. 10). The broadband data modem 204 provides wireline access to the data network 104 via the wireline broadband network connection 200. The wireless data modem 220 provides wireless access to the wireless network 404 using the wireless network connection 202.

In both FIGS. 24 and 25, network intelligence in the client-side security application 112 is able to automatically establish Internet Protocol communication between the alarm controller 106 and the monitoring station 102 (not illustrated for simplicity). The client-side security application 112 may use the wireline broadband network connection 200 and/or the wireless network connection 202. The wireless network connection 202 to the wireless network 404 may be cellular data, but any wireless standard (e.g., CDMA, TDMA, GSM, 3G, 4G, BLUETOOTH, WI-FI) and any frequency may be used. When the customer is away from home and successfully authenticates access (perhaps using the portal web page discussed above), network intelligence in the portal web page may also automatically establish IP communication between the customer's remote communications device and the client-side security application 112 using the wireline broadband network connection 200 and/or the wireless network connection 202. Network connectivity may be continuously verified between the alarm controller 106 and the monitoring station 102.

When the alarm condition 140 is detected, Voice over Internet Protocol technology may be used to verify the alarm condition 140. The Voice over Internet Protocol call 124 may be established with the customer in their home, or another entity may be alerted to the alarm condition 140. During the alarm condition 140, the computerized/human agent 122 in the monitoring station 102 may be authorized by the customer to access specified video cameras in the home to verify that there is a true need for emergency help.

The alarm controller 106 and the security server 160 are only simply illustrated. Because the architecture and operating principles of processor-controlled devices are well known, their hardware and software components are not further shown and described.

Exemplary embodiments may be applied regardless of networking environment. The data network xx may be a cable network operating in the radio-frequency domain and/or the Internet Protocol (IP) domain. The data network 104, however, may also include a distributed computing network, such as the Internet (sometimes alternatively known as the "World Wide Web"), an intranet, a local-area network (LAN), and/or a wide-area network (WAN). The data network 104 may include coaxial cables, copper wires, fiber optic lines, and/or hybrid-coaxial lines. The data network 104 may even include wireless portions utilizing any portion of the electromagnetic spectrum and any signaling standard (such as the I.E.E.E. 802 family of standards, GSM/CDMA/TDMA or any cellular standard, and/or the ISM band). The data network 104 may even include powerline portions, in which signals are communicated via electrical wiring. The concepts described herein may be applied to any wireless/wireline communications network, regardless of physical componentry, physical configuration, or communications standard(s).

Figure 26:
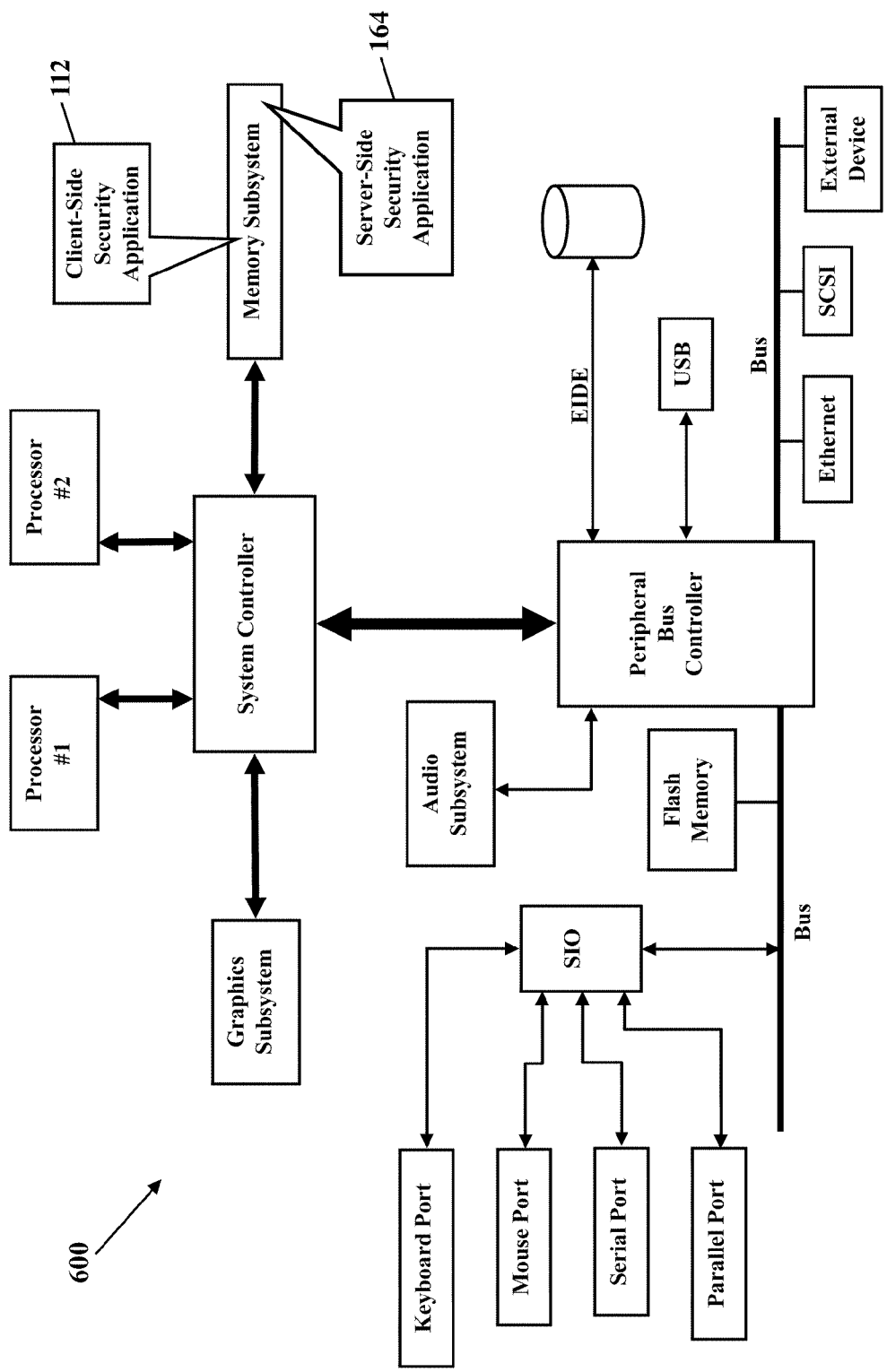
FIG. 26 is a schematic illustrating a generic block diagram of a processor-controlled device, according to exemplary embodiments.

FIG. 26 is a schematic illustrating still more exemplary embodiments. FIG. 26 is a generic block diagram illustrating the client-side security application 112 and/or the server-side security application 164 may operate within a processor-controlled device 600. The client-side security application 112 and/or the server-side security application 164 may be stored in a memory subsystem of the processor-controlled device 600. One or more processors communicate with the memory subsystem and execute the client-side security application 112 and/or the server-side security application 164. Because the processor-controlled device 600 illustrated in FIG. 26 is well-known to those of ordinary skill in the art, no detailed explanation is needed.

Figure 27:
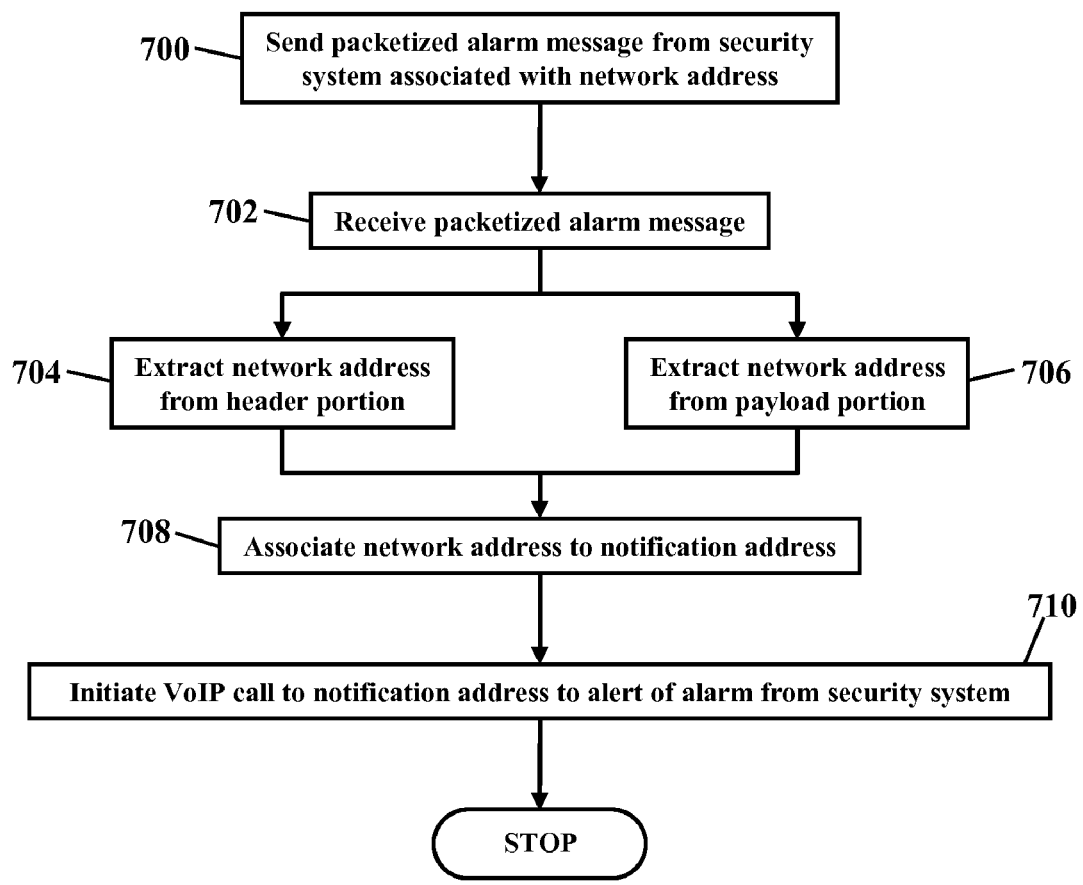
FIGS. 27-29 are flowcharts illustrating a method of providing security services, according to exemplary embodiments.

FIG. 27 is a flowchart illustrating a method of providing security services. A packetized alarm message 118 is sent over a data network 104 from a security system 100 associated with a network address 142 (Block 700). The packetized alarm message 118 is received (Block 702). The network address 142 may be extracted from a header portion 168 (Block 704) and/or a payload portion 170 (Block 706) of the packetized alarm message 118. The network address 142 is associated to a notification address 172 (Block 708). A Voice-over Internet Protocol call 124 is initiated over the data network 104 to the notification address 172 to alert of an alarm from the security system 100 (Block 710).

Figure 28:
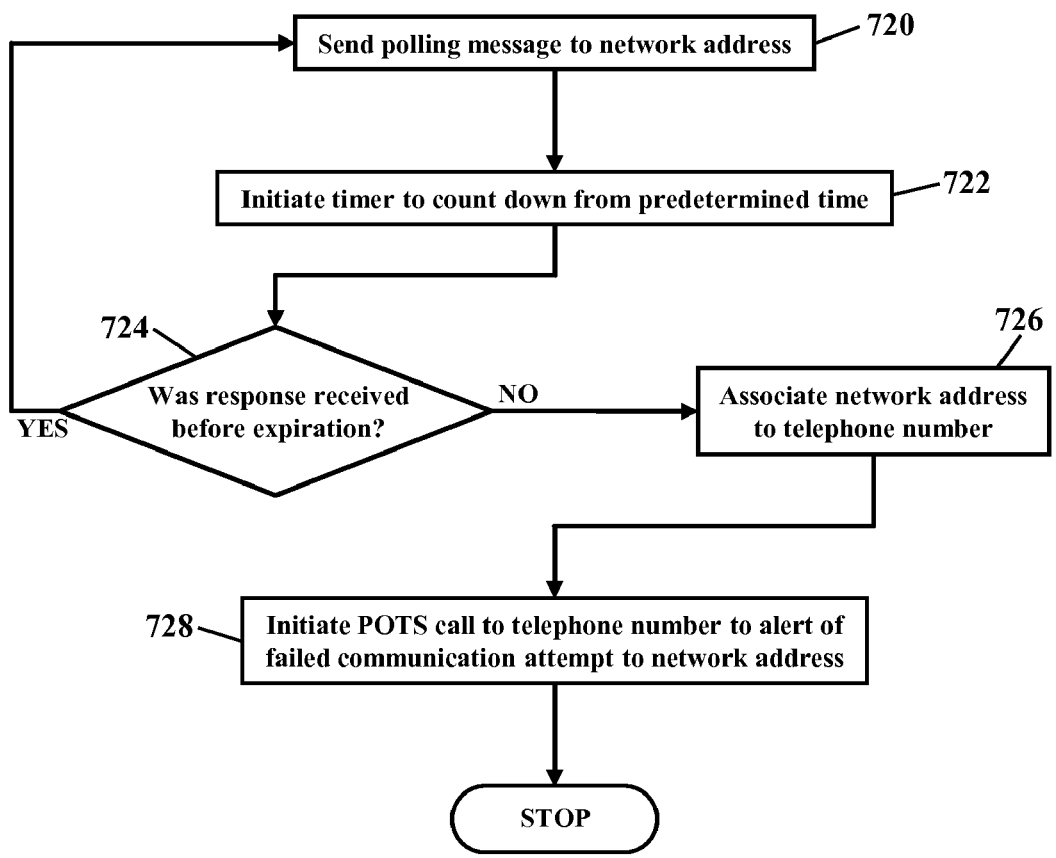

FIG. 28 is another flowchart illustrating the method of providing security services. A polling message 250 is periodically sent over the data network 104 to the network address 142 (Block 720). A timer is initiated and counts down from a predetermined time (Block 722). If a response is not received within expiration of the timer (Block 724), then the network address 142 is associated to a telephone number (Block 726). A plain old telephone system call is initiated or established to the telephone number to alert of a failed communication attempt to the network address 142 (Block 728).

Figure 29:
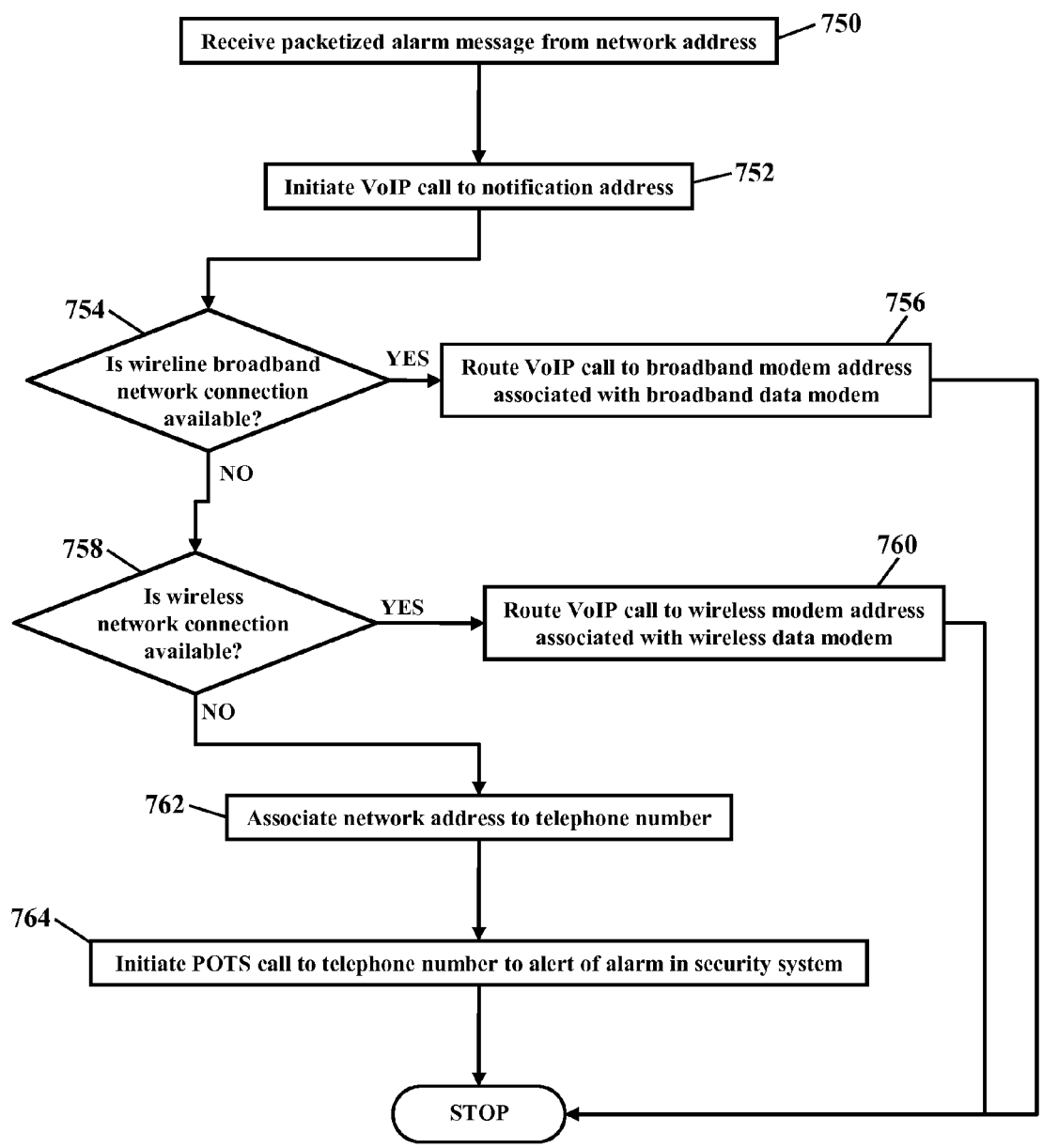

FIG. 29 is another flowchart illustrating the method of providing security services. The packetized alarm message 118 is received (Block 750). A Voice-over Internet Protocol call 124 is initiated over the data network 104 to the notification address 172 (Block 752). If the wireline broadband network connection 200 is available (Block 754), the Voice-over Internet Protocol call 124 is routed to a broadband modem address 206 associated with a broadband data modem 204 (Block 756). When the wireline broadband network connection 200 is unavailable (Block 754), and if a wireless network connection 202 is available (Block 758), then the Voice-over Internet Protocol call is routed to a wireless modem address associated with a wireless data modem (Block 760). If the wireless network connection is unavailable to the data network (Block 758), then the network address is associated to a telephone number (Block 762). A POTS call is initiated to the telephone number to alert of the alarm in the security system (Block 764).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for alerting of alarms from security systems.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:
1. A method, comprising:
receiving a packetized alarm message at a monitoring server, the packetized alarm message sent from a security system associated with a network address;
querying a database that associates network addresses to notification addresses;
retrieving a notification address associated with the network address associated with the security system; and initiating a Voice-over Internet Protocol call over a data network to the notification address to alert of an alarm from the security system.

2. The method according to claim 1, further comprising determining whether a wireline broadband network connection is available to the network address.

3. The method according to claim 2, further comprising routing the Voice-over Internet Protocol call to a broadband modem address associated with a broadband data modem when the wireline broadband network connection is available.

4. The method according to claim 3, further comprising routing the Voice-over Internet Protocol call to a wireless modem address associated with a wireless data modem when the wireline broadband network connection is unavailable.

5. The method according to claim 1, further comprising sending the packetized alarm message over the data network.

6. The method according to claim 1, further comprising extracting the network address from a header portion of the packetized alarm message.

7. The method according to claim 1, further comprising extracting the network address from a payload portion of the packetized alarm message.

8. The method according to claim 1, further comprising periodically sending a polling message over the data network to the network address.

9. The method according to claim 8, further comprising receiving a response to the polling message.

10. The method according to claim 9, further comprising associating the network address to a telephone number when the response is not received within a predetermined amount of time.

11. The method according to claim 10, further comprising initiating a plain old telephone system call to the telephone number to alert of a failed communication attempt to the network address.

12. A system, comprising:
a processor; and
memory for storing code that when executed causes the processor to perform operations, the operations comprising:
receiving an alarm code detected by a security system;
querying a database for the alarm code, the database associating alarm codes to network addresses;
retrieving a network address from the database that is associated with the alarm code; and
sending a packetized alarm message to the network address to notify of the alarm code detected by the security system.

13. The system according to claim 12, further comprising code that causes the processor to perform operations comprising sending the packetized alarm message over a wireline broadband network connection to the data network.

14. The system according to claim 12, further comprising code that causes the processor to perform operations comprising sending the packetized alarm message over a wireless network connection to the data network.

15. The system according to claim 12, further comprising code that causes the processor to perform operations comprising determining an availability of a connection to a data network.

16. A system, comprising:
a processor; and
memory for storing code that when executed causes the processor to perform operations, the operations comprising:
storing associations between a plurality of alarm codes to a plurality of network addresses such that different alarm codes are associated with different network addresses;
receiving an alarm code associated with an alarm detected by a security system;
querying the associations for the alarm code;
retrieving a network address associated with the alarm code;
sending a packetized alarm message to the network address over a wireline broadband network connection to a data network; and
sending the packetized alarm message over a wireless network connection to the data network when the wireline broadband network connection is unavailable.

17. The system according to claim 16, further comprising code that causes the processor to perform operations comprising:
receiving multiple alarm codes associated with the alarm; and
sending multiple packetized alarm messages to multiple network addresses such that each of the multiple packetized alarm messages routes to the network address associated with the alarm code.

18. The system according to claim 16, further comprising code that causes the processor to perform operations comprising periodically testing an availability of the wireline broadband network connection to the data network.

19. The system according to claim 16, further comprising code that causes the processor to perform operations comprising periodically testing an availability of the wireless network connection to the data network.

20. A computer readable memory storing processor executable instructions that, when executed by a processor, cause the processor to perform operations, the operations comprising:
receiving an alarm code associated with an alarm detected by a security system;
storing a database that associates alarm codes to network addresses such that different alarm codes are associated with different network addresses;
querying the database for the alarm code associated with the alarm;
retrieving a network address from the database that is associated with the alarm code;
when a wireline broadband network connection is available to a data network, then sending a packetized alarm message to the network address over the wireline broadband network connection;
when the wireline broadband network connection is unavailable, then sending the packetized alarm message over a wireless network connection to the data network;
when the wireless network connection is unavailable to the data network, then associating the network address to a telephone number; and
initiating a telephone call to the telephone number to alert of the alarm in the security system.

* * * * *